US012488176B1

(12) United States Patent
Kaur et al.

(10) Patent No.: US 12,488,176 B1
(45) Date of Patent: Dec. 2, 2025

(54) SYSTEMS AND METHODS FOR REDUCING TEST POINT POWER CONSUMPTION IN A CIRCUIT DESIGN

(71) Applicant: Cadence Design Systems, Inc., San Jose, CA (US)

(72) Inventors: Jagjot Kaur, Fremont, CA (US); Vivek Chickermane, Slaterville Springs, NY (US)

(73) Assignee: Cadence Design Systems, Inc., San Jose, CA (US)

( * ) Notice: Subject to any disclaimer, the term of this patent is extended or adjusted under 35 U.S.C. 154(b) by 895 days.

(21) Appl. No.: 17/573,462

(22) Filed: Jan. 11, 2022

(51) Int. Cl.
*G06F 30/398* (2020.01)
*G06F 1/3237* (2019.01)

(52) U.S. Cl.
CPC .......... *G06F 30/398* (2020.01); *G06F 1/3237* (2013.01)

(58) Field of Classification Search
CPC .............................. G06F 1/3237; G06F 30/398
See application file for complete search history.

(56) References Cited

U.S. PATENT DOCUMENTS

| 8,104,012 | B1 * | 1/2012 | Klein | G06F 30/327 716/132 |
| 10,222,417 | B1 * | 3/2019 | Garg | G06F 11/25 |
| 10,740,515 | B1 | 8/2020 | Kaur | |
| 2004/0225978 | A1 * | 11/2004 | Fan | G06F 30/30 716/103 |
| 2012/0110527 | A1 * | 5/2012 | Matsubara | G06F 30/3323 716/106 |
| 2022/0286638 | A1 * | 9/2022 | Aizawa | H04N 25/7795 |

OTHER PUBLICATIONS

Yeung et al., "Multi-Domain Verification: When Clock, Power and Reset Domains Collide", DVCon 2015, Design and Verification Conference on, pp. 1-11, May 2015 (Year: 2015).*
Miao He, et al., "Test-Point Insertion Efficiency Analysis for LBIST in High-Assurance Applications", IEEE Transactions On Very Large Scale Integration (VLSI) Systems, 1063-8210, 2017.
Eggersglüb, Stephan, "Towards Complete Fault Coverage by Test Point Insertion using Optimization-SAT Techniques", IEEE International Test Conference in Asia (ITC-Asia), 2019, DOI 10.1109/ITC-Asia.2019.00025, pp. 67-72, Hamburg, Germany.

(Continued)

*Primary Examiner* — Jack Chiang
*Assistant Examiner* — Aric Lin
(74) *Attorney, Agent, or Firm* — Foley & Lardner LLP

(57) ABSTRACT

The present disclosure relates to reducing power consumption of test point circuit elements of an integrated circuit (IC) design. An ungated input clock for at least one testing point circuit element for the IC design can be identified. The IC design can be updated by coupling a test point clock gating circuit element to a clock gate input node of the IC design that is to receive the ungated input clock, to the at least one test point circuit element, and to a test mode signal generation element that is to provide a test mode signal to create an updated IC design. The test point clock gating circuit element can be enabled and disabled based on a logical value of the test mode signal to control a supply of the ungated input clock to the at least one testing point circuit element.

14 Claims, 8 Drawing Sheets

(56) References Cited

OTHER PUBLICATIONS

Padmapriya, et al., "Improving Test Coverage of Hi-Reliability ASIC Designs with Test Point Insertion for Space Applications", Proceedings of the International Conference on Smart Electronics and Communication (ICOSEC 2020) IEEE Xplore Part No. CFP20V90-ART; ISBN: 978-1-7281-5461-9, 2020, pp. 1099-1103, Bangalore, Karnataka.

Vranken, et al., "Impact of Test Point Insertion on Silicon Area and Timing during Layout", Proceedings of the Design, Automation and Test in Europe Conference and Exhibition (DATE'04), 2004 IEEE.

Yang, et al., "Test Point Insertion with Control Point by Greater Use of Existing Functional Flip-Flops", pp. 1-10, 2014 ETRI.

Miao He, et al., "Test-Point Insertion Efficiency Analysis for LBIST Applications", IEEE 34th VLSI Test Symposium (VTS), 2016.

Acero, et al., "Embedded Deterministic Test Points", EEE Transactions On Very Large Scale Integration (VLSI) Systems, pp. 1-13, 2017.

* cited by examiner

SYSTEMS AND METHODS FOR REDUCING TEST POINT POWER CONSUMPTION IN A CIRCUIT DESIGN

TECHNICAL FIELD

This disclosure relates to electronic design automation (EDA) applications. More particularly, this disclosure relates to reducing power consumption of test point circuit elements in a fabricated integrated circuit (IC) chip based on an IC design.

BACKGROUND

EDA is a category of systems for assisting with the design of electronic systems and devices. EDA tools are used for synthesis, debugging, and functional verification of integrated circuit (IC) designs. Due to the complexity of IC designs, methods such as Design for Testability (DFT) have been developed. DFT is a method that adds testability features to a circuit design to make it easier to develop tests for and apply tests to a resulting IC design (e.g., a chip). Beyond the basic functional elements of a circuit design, DFT allows test points to be inserted into the IC design to allow testing of the circuit after fabrication. Not all nodes within the IC circuit will include test points, as addition of test points increases cost. EDA may thus include systems for efficient test coverage analysis and test point insertion.

SUMMARY

The present disclosure relates to IC design for reducing power consumption of test point circuit elements.

In an example, a computer implemented method comprises accessing, using one or more hardware processors, an IC design stored in memory. The IC design can include one or more test point circuit elements and a test mode signal generation element. The computer implemented method can include identifying, using the one or more hardware processors, an ungated input clock for at least one testing point circuit element for the IC design, and updating, using the one or more hardware processors, the IC design stored in the memory by coupling a test point clock gating circuit element to a clock gate input node that is to receive the ungated input clock for the at least one testing point circuit element, to the at least one test point circuit element, and to the test mode signal generation element that is to provide a test mode signal to create an updated IC design. The test point clock gating circuit element can be enabled and disabled based on a logical value of the test mode signal to control a supply of the ungated input clock to the at least one testing point circuit element.

In yet another example, a system can include memory to store machine-readable instructions and an IC design that can include test point circuit elements and a test mode signal generation element. The system can include one or more processors to access the memory and execute the machine-readable instructions. The machine-readable instructions can include a domain partitioner that can be programmed to generate clock and power domain data identifying clock and power domains for the test point circuit elements for the IC design. The machine-readable instruction can further include a domain matrix generator programmed to generate a clock and power (CP) domain matrix based on the clock and power domain data and apply clock and power domain reduction methods to the CP domain matrix to identify first and second test point circuit elements of the test point circuit elements that belong to different clock and power domains and are testable together during a test mode of operation. The machine-readable instruction can further include clock gating control (CGC) logic that can be programmed to update the IC design stored in the memory by coupling a first test point clock gating circuit element to a first clock gate input node in the IC design that is to receive a first ungated input clock for the first test point circuit element, and to an output of the test mode signal generation element that is to provide a test mode signal, and by coupling a second test point clock gating circuit element to a second clock gate input node in the IC design that is to receive a second ungated input clock for the second test point circuit element, and to the output of the signal generation element to create an updated IC design.

In another example, a non-transitory machine-readable medium can include machine-readable instructions that can include a synthesis tool. The synthesis tool can identify an ungated input clock for respective test point elements for an IC design, identify a source circuit of source circuits for powering the respective test point circuit elements for the IC design, generate clock and domain data identifying clock and power domains for each test point circuit element of the respective test point circuit elements for the IC design based on a respective identified ungated input clock and source circuit, and generate a CP domain matrix based on the clock and power domain data. Each cell of the CP domain matrix can identify a number of test point circuit elements that belong to a given clock and power domain of a plurality of clock and power domains. The synthesis tool can further identify first and second sets of test point circuit elements belonging to different clock and power domains of the plurality of clock and power domains and that are testable together during a test mode of operation of the first and second sets of test point circuit elements, and accesses memory storing the IC design to update the IC design by coupling a first test point clock gating circuit element to a first clock gate input node in the IC design that is to receive a first ungated input clock for the first test point circuit element, and to an output of a test mode signal generation element that is to provide a test mode signal, and further by coupling a second test point clock gating circuit element to a second clock gate input node in the IC design that is to receive a second ungated input clock for the second test point circuit element, and to the output of the test mode signal generation element to create an updated IC design.

DETAILED DESCRIPTION

Figure 1:
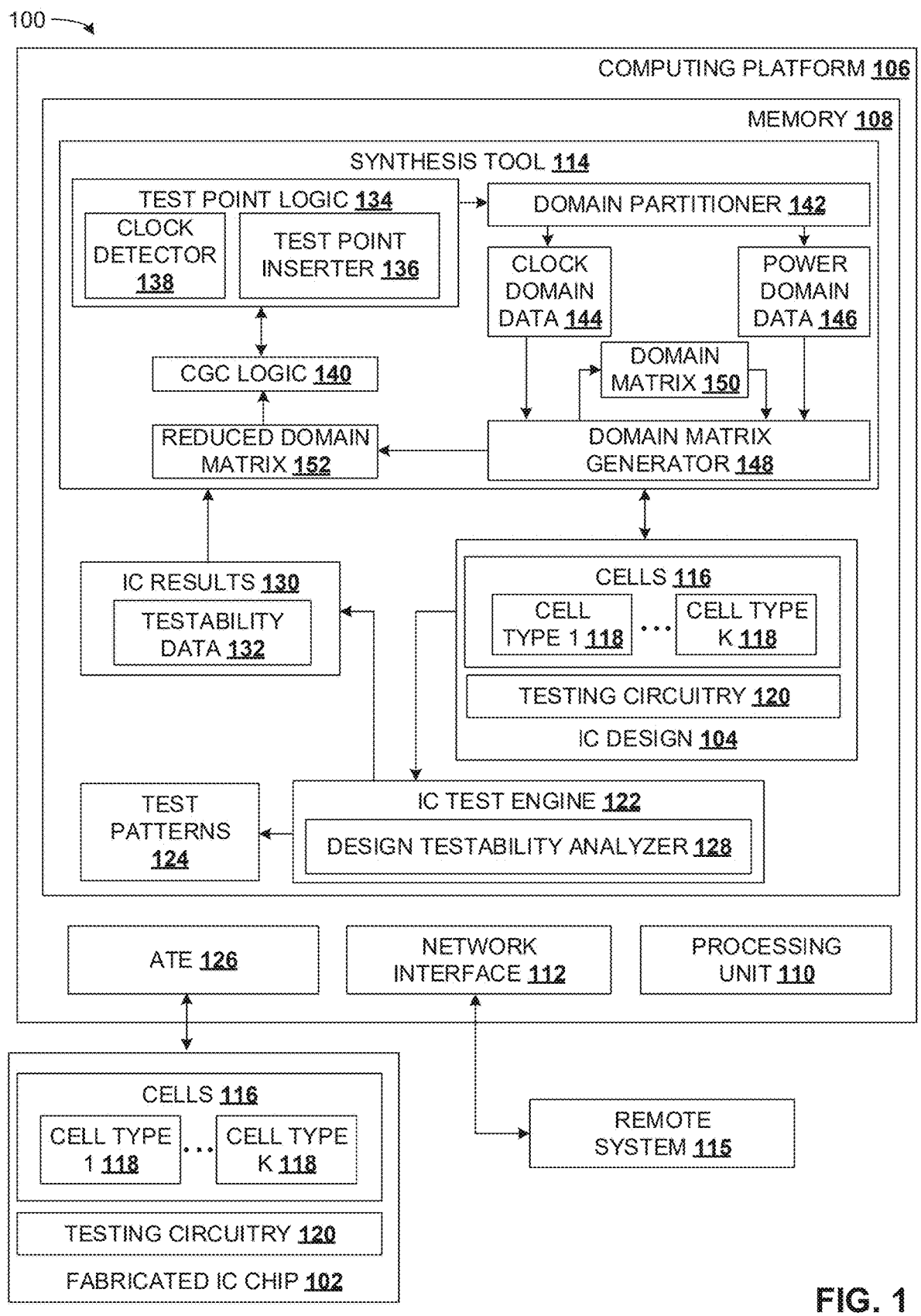
FIG. 1 illustrates an example of a system for testing a fabricated IC chip that is based on an IC design.

Examples are described herein for reducing power consumed during test and functional mode of operations by test point circuit elements based on an IC design for DFT as part of EDA operations in creating and updating circuit designs. DFT consists of IC design techniques that add testability features (e.g., testing circuitry) to an IC design. DFT plays an important role in improving product yield for IC chips. Test coverage and test efficiency are important parameters for design quality with DFT techniques. Test coverage can refer to a percentage of detected fault from detectable fault in an IC design. An objective of DFT includes high test coverage that is achieved if all signals at nodes of an IC design are fully observable and/or controllable. Observation of nodes in an IC design can be achieved by insertion of test point circuit elements into the IC design.

While using ungated input clocks for test point insertion reduces a coverage correlation gap, such free-running clocks used for enabling operations of test point circuit elements in an IC design increase an amount power consumed during a functional mode of operation of the test point circuit elements. During the functional mode of operation, the test point circuit elements are not capturing nor scan-shifting out captured values at a respective node in the IC design, however, continue to receive an ungated input clock. Because the ungated input clock causes switching circuit elements (e.g., flip flops) of the test point circuit elements to continue switching states leads to an increase in dynamic power that is dissipated by the test point circuit elements.

The term "functional mode" as used herein refers to a state of functional logic of an IC design or a fabricated IC chip based on the IC design that is implementing normal functionality and testing circuitry is not enabled for testing the functional logic. Thus, during the functional mode of operation, the test point circuit elements are not enabled and can be referred to herein as operating in the functional mode of operation. In contrast, the test mode of operation enables the testing circuitry so as to provide stimulus to the functional logic and collect the response of the functional logic in the test circuitry thereby making the functional circuit nodes controllable and observable. Thus, during the testing mode of operation, the test point circuit elements are enabled and can be referred to herein as operating in the test mode of operation.

According to the examples described herein, dynamic power consumed by test point circuit elements in an IC design can be curtailed. As described herein a synthesis tool with CGC can be employed to insert a test point clock gating circuit element into the IC design. The CGC logic can couple an ungated input clock node identified by a clock detector of the synthesis tool to a clock input of the test point clock gating circuit element. The CGC logic can couple a test input of the test point clock gating circuit element in some examples to a test mode signal generation element in the IC design. In some examples, the test mode signal generation element is a test data register (TDR) element.

The test point clock gating circuit element can receive a test mode signal during test operations of the IC design, for example from the test mode signal generation element. The CGC logic can couple an output of the test point clock gating circuit element to a clock input of one or more test point circuit elements in the IC design. The ungated input clock can be provided to the one or more test point circuit elements based on the test mode signal received at the test clock input of the test point clock gating circuit element. Because the test point clock gating circuit element does not provide the ungated input clock to the one or more test point circuit elements during the functional mode of operation, the dynamic power consumed by the one or more test point circuit elements (e.g., in a fabricated IC chip based on the IC design) is curtailed, as switching elements of the one or more test point circuit elements do not switch states.

In some examples, the synthesis tool can include a domain partitioner that can identify test point circuit elements for the IC design that are to share a common ungated input clock and that are to be coupled to a similar source circuit element in the IC design. By identifying test point circuit elements that are to have a common ungated input clock and are to be powered by a similar source circuit element reduces a number of test point clock gating circuit elements for the IC design for clock gating the test point circuit elements therein. By reducing the number of test point clock gating circuit elements, the fabricated IC chip based on the IC design can have a smaller area overhead as a lower number of connections (e.g., traces) is needed for routing test mode signals.

For example, the domain partitioner can provide clock domain data identifying the test point circuit elements for the IC design that are associated with a respective clock domain and thus are to receive a common ungated input clock. Furthermore, the domain partitioner can provide power domain data identifying the test point circuit elements for the IC design that are to be powered by a common source circuit element in the IC design and thus belong to a respective power domain. The synthesis tool can employ a domain matrix generator. The domain partitioner as described herein can be used to logically group test point circuit elements for the IC design into respective clock and power domains for selective activation of the test point circuit elements. Because select test point circuit elements of the test point circuit elements in the fabricated IC chip based on the IC design are to be enabled together (e.g., rather than all of the test point circuit elements), an amount of power that is dissipated by the test point circuit elements of the fabricated IC chip is reduced during the test mode of operation.

The synthesis tool can employ a domain matrix generator. The domain matrix generator can process the clock and power domain data to identify test point circuit elements that are associated with respective power and/or clock domains and that can be tested together. Asynchronous clock domains can be tested together. Power domains that can be tested together in the IC design can be based on a design architecture. For example, in some designs (e.g., power critical designs), it is desirable that not all cores of a fabricated IC chip are tested together to avoid damaging the chip (e.g., burning of the chip). Thus, power domains can be tested together to avoid damage to the IC chip, and can be identified according to the examples herein. The power domains that can be tested together can refer to respective domains in the IC design that can stay within power specifications of a given chip during testing. Power specification information can be provided to the synthesis tool as described herein using a Unified Power Format (UPF).

By way of further example, the domain matrix generator can compute a CP domain matrix based on the clock and power domain data. The CP matrix can include cells or blocks that can identify a number of test point circuit elements associated with a respective clock and power domain. The domain matrix generator can implement a clock domain reduction method on the CP domain matrix to identify cells therein and thus respective test point circuit elements associated with respective clock domains that can be tested together. The domain matrix generator can merge (e.g., combine) the identified cells from the CP domain matrix to reduce the CP domain matrix to provide a first reduced CP domain matrix. In some examples, the domain matrix generator can implement a power domain reduction method on the first reduced CP domain matrix (or in some examples on the CP domain matrix) to identify cells and thus respective test point circuit elements associated with respective power domains that can be tested together. The domain matrix generator can merge (e.g., combine) the identified cells of the first reduced CP domain matrix to provide a second reduced CP domain matrix.

In some examples, the domain matrix generator can iteratively implement the clock and power domain reduction methods. The domain matrix generator can evaluate each reduced CP domain matrix following a respective domain matrix reduction using one of the clock and power domain reduction methods, or a combination thereof, to determine a number of test point clock gating circuit elements for the IC design. By identifying test point circuit elements for the IC design that can be tested together reduces a number of test point clock gating circuit elements for the IC design as test mode signals can be shared among different sets of the test point circuit elements for the IC design. The CGC logic can employ the reduced CP domain matrix to determine the number of test point clock gating circuit elements for the IC design and how the test point clock gating circuit elements are to be coupled with respect to corresponding test point circuit elements in the IC design based on the reduced CP domain matrix. Moreover, the CGC logic can determine which test point circuit elements in the IC design are to be enabled (e.g., together) and thus tested together based on the reduced CP domain matrix.

The CGC logic can insert the test point clock gating circuit elements into the IC design and couple the test point clock gating circuit elements to corresponding test point circuit elements based on the reduced CP domain matrix. The CGC logic can insert the test mode signal generation element into the IC design. The CGC logic can configure (e.g., program) the test mode signal generation element, for example, when to provide a respective test mode signal to test point circuit elements associated with a respective power and/or clock domain based on the reduced CP domain matrix. Because the test mode signal generation element enables select test point circuit elements of the test point circuit elements in the fabricated IC chip based on the IC design, an amount of power that is dissipated by the test point circuit elements in the fabricated IC chip is reduced as the select test point circuits elements are enabled during the test mode of operation.

FIG. 1 illustrates an example of a system 100 for testing a fabricated IC chip 102 that is based on an IC design 104. The system 100 can include a computing platform 106. The computing platform 106 can include memory 108 for storing machined readable instructions and data and a processing unit 110 for accessing the memory 108 and executing the machine-readable instructions. The memory 108 represents a non-transitory machine-readable memory (or other medium), such as random access memory (RAM), a solid state drive, a hard disk drive, or a combination thereof. The processing unit 110 can be implemented as one or more processor cores. The computing platform 106 can include a network interface 112 (e.g., a network interface card) configured to communicate with other computing platforms via a network, such as a public network (e.g., the Internet), a private network (e.g., a local area network (LAN)) or a combination thereof (e.g., a virtual private network).

The computing platform 106 could be implemented in a computing cloud. In such a situation, features of the computing platform 106, such as the processing unit 110, the memory 108, and the network interface 112 could be representative of a single instance of hardware or multiple instances of hardware with applications executing across the multiple of instances (e.g., distributed) of hardware (e.g., computers, routers, memory, processors, or a combination thereof). Alternatively, the computing platform 106 could be implemented on a single dedicated server or workstation.

The IC design 104 can be stored in the memory 108 of the computing platform 106. The IC design 104 can be implemented, for example, as design specifications for an IC chip. The IC design 104 can be generated with an EDA application, such as a synthesis tool 114. The synthesis tool 114 can be implemented as application software or a software module. In the example of FIG. 1, the synthesis tool 114 is executed on the computing platform 106, however, in other examples, the synthesis tool 114 is executed on a remote system 115. For instance, an end-user of the EDA application can employ a user-interface to generate and/or modify hardware description language (HDL) code (e.g., Verilog) for generating a register-transfer level (RTL) model (e.g., RTL code) characterizing a circuit. The RTL model can be transformable by the synthesis tool 114 into a physically realizable gate-level netlist for the IC design 104.

The fabricated IC chip 102 can represent a physically instantiated version of the IC design 104. More particularly, the fabricated IC chip 102 and the IC design 104 can include cells 116. Each of the cells 116 can represent a group of transistors and intercoupled structures that provides a Boolean logic function (e.g., AND, OR, NOR, NAND, XOR, XNOR, inverters) or a storage function (e.g., flip flop or latch). The cells 116 of the fabricated IC chip 102 represent physically instantiated versions of the cells 116 of the IC design 104. Thus, the cells 116 of the IC design 104 and the cells 116 of the fabricated IC chip 102 employ the same reference numbers. In many instances, there can be virtually any number of cells 116 (e.g., hundreds, thousands or millions). In the present example, there are K number of different cell types 118 of the cells 116, where K is an integer greater than or equal to one. Additionally, there are R number of cell instances for each of the K number of cell types 118, where R is an integer greater than or equal to one.

Each cell instance represents a specific instantiation in the IC design 104 for a corresponding cell type 118. Moreover, there can be a different (or the same) number of cell instances for each of the K number of cell types 118. The IC design 104 has a variety of cell types 118 based on the architecture of the IC design 104 and the specific operating environment in which the fabricated IC chip 102 is designed to operate. In some examples, the fabricated IC chip 102 can include an interface that enables external systems to provide stimuli to the components of the fabricated IC chip 102, including the cells 116 of the fabricated IC chip 102. The interface can conform to the standards set forth in the IEEE 1149.1 standards, IEEE 1149.6 standards, and can be implemented with PCI, wafer probes, etc.

In some examples, the fabricated IC chip 102 and the IC design 104 can include testing circuitry 120. The test circuitry 120 can include a scan chain that can be formed of scan flops to propagate test patterns through the IC design 104. The testing circuitry 120 can include a logic built-in self test (LBIST) and a pattern generator (e.g., a PRPG) for generating test patterns that are to be propagated along the scan chains during testing operations of functional logic (e.g., of one or more cells of the cells 116) of IC design 104. As described herein, at least some of the scan chains can include one or more test point circuit elements for testing nodes (e.g., of one or more cells of the cells 116) in the IC design 104.

The memory 108 includes an IC test engine 122 which can be implemented as application software or a software module. In the example of FIG. 1, the IC test engine 122 is implemented on the computing platform. In other examples, the IC test engine 122 can be implemented at the remote system 115. The IC test engine 122 is configured to execute Automatic Test Pattern Generation (ATPG) techniques to provide test patterns 124 based on the IC design 104. The IC test engine 122 can provide test patterns 124 that are employable for testing the fabricated IC chip 102. In some examples, the test patterns 124 are employable by the testing circuitry 120 (e.g., can be generated by an on-chip pattern generator, such as the PRPG) to test the fabricated IC chip 102. In other examples, the test patterns 124 are employable by Automatic Test Equipment (ATE) 126 to test the fabricated IC chip 102. In some examples, the test patterns 124 are stored in the memory 108 and/or the ATE 126 prior to execution of the testing. The ATE 126 can alternatively be referred to as an IC chip tester or an IC chip tester machine. The ATE 126 can be implemented as a hardware device that is electrically coupled to pins on the fabricated IC chip 102. In these examples, such pins can be coupled to the interface of the fabricated IC chip 102.

The test patterns 124 employed by the ATE 126 contain stimuli to be applied to inputs and the expected values on the outputs of the fabricated IC chip 102. The ATE 126 is configured such that if the measured value by the ATE 126 is different from the expected value specified in the test patterns 124, the ATE 126 stores the failure data. The failure data can be sent to the IC test engine 122 later to determine a cause of one or more failures in the fabricated IC chip 102. In situations where an application of the test patterns 124 indicates that the fabricated IC chip 102 is operating properly (e.g., within acceptable tolerances), the fabricated IC chip 102 can be approved for deployment. In situations where the application of the test patterns 124 indicates that the fabricated IC chip 102 is not operating properly (e.g., within tolerances), the fabricated IC chip 102 can be rejected, such that the fabricated IC chip 102 is not deployed.

By way of further example, the IC test engine 122 can include a design testability analyzer 128 that can analyze a test coverage in the IC design 104 to identify one or more nodes to which uncontrollable and/or unobservable logic is coupled in the IC design 104. The term "uncontrollable logic" used herein can refer to functional logic in an IC design that cannot be stimulated during testing operations of a fabricated IC chip based on the IC design. The term "unobservable logic" as used herein can refer to an input and/or output of functional logical in an IC design that cannot be observed during testing operations of a fabricated IC chip based on the IC design. The functional logic can represent functional logical operators (e.g., gates, or sequential logical operations) formed by one or more cells (e.g., one of the cells 116) that execute a function of the IC design. A node in an IC design in which a value at that node cannot be shifted out through scan patterns and observed through scan out ports of a scan chain can be referred to as an unobservable node. In some examples, an unobservable node in an IC design is where an observe test point is inserted to make it observable. By contrast, a node in an IC design in which a value at that node can be shifted out through scan patterns and observed through scan out ports can be referred to as an observable node.

The design testability analyzer 128 can analyze the test coverage in the IC design 104 to identify unobservable nodes (e.g., input and/or output nodes) and/or unobservable logic. In examples wherein the design testability analyzer 128 identifies unobservable logic in the IC design 104, the design testability analyzer 128 may identify an input node to the unobservable logic. The IC test engine 122 can provide IC results 130 that include testability data 132 identifying the unobservable nodes and logic.

For example, the design testability analyzer 128 can include functionality to analyze a testability (e.g., the test coverage) of the IC design 104 by performing ATPG-based analysis. In some instances, the design testability analyzer 128 includes logic analysis to identify the unobservable nodes in the IC design 104 to improve random pattern testability of IC designs tested using random resistance fault analysis (RRFA). In some examples, the design testability analyzer 128 includes compression analysis logic to identify the unobservable nodes in the IC design 104 for reducing pattern counts for ATPG compression and full scan designs. In further examples, the design testability analyzer 128 can include deterministic fault analysis logic to identify unobservable nodes in the IC design 104 to improve test coverage by analyzing deterministic untestable and inactive faults on full scan designs.

The design testability analyzer 128, in some examples, can use RRFA to identify sections of the IC design 104 that are resistant to testing by flat, uniformly distributed random patterns and provide analysis information to help improve the random pattern testability of the IC design 104. This analysis information is based on signal probabilities computed by the design testability analyzer 128 simulating random patterns and counting a number of times each net takes on values 0, 1, X, and Z with respect to the IC design 104. The design testability analyzer 128 can use faults that were not tested during the random pattern simulation to identify points (e.g., logic) in the IC design 104 that tend to block fault activation and propagation to respective nodes. These nodes then become test points for control and/or observation, and data identifying such nodes can be stored as or part of the testability data 132.

The synthesis tool 114 employs test point logic 134 to process the IC results 130 that include the testability data 132 for insertion of a test point circuit element into the IC design 104. For example, the test point logic 134 can include a test point inserter 136. The test point inserter 136 can access the IC design 104 stored in the memory 108. For example, the IC design 104 can include circuit elements and input clock gate (ICG) circuit elements. The test point inserter 136 can implement a test point insertion method with respect to the IC design 104 to transform a previously unobservable node into an observable node in the IC design 104. For example, the test point inserter 136 can identify or select a node corresponding to an unobservable node coupled to a data output of a respective circuit element of the circuit elements for insertion of the test point circuit element based on the testability data 132. As an example, the respective circuit element is a flip flop circuit element. The test point circuit element can include a data input and a clock input. The test point circuit element can be inserted by the test point inserter 136 into the IC design 104 to couple the data input of the test point circuit element to the node and the data output of the respective circuit element.

The test point logic 134 can employ a clock detector 138 for identifying a clock in the IC design 104 for clocking of the respective test point circuit element. The clock detector 138 can identify one or more circuit elements of the circuit elements that contribute to a data state at the node. The one or more identified circuit elements that contribute to the data state at the node can be referred to as contributing circuit elements. By way of example, the contributing circuit elements can include flip flop circuit elements that are upstream in the IC design 104 with respect to the respective circuit element. The clock detector 138 can trace a clock for the contributing circuit elements that feed into the node back through one or more (in some instances all) levels of clock gating logic. For example, the clock detector 138 can trace clock inputs to the contributing circuit elements back through the ICG circuit elements back to ungated input clocks. The clock detector 138 can identify an ungated input clock node for a last identified ICG circuit element of the ICG circuit elements (e.g., a last element of a trace-back or an earliest input in a clock tree). In some examples, the clock detector 138 can identify the ungated input clock node based on a position of the ungated input clock node within the IC design 104. The ungated input clock node can receive an ungated input clock of the ungated input clocks.

The test point logic 134 can include CGC logic 140. The CGC logic 140 can insert a test point clock gating circuit element into the IC design 104 for reducing an amount of dynamic power dissipated by the test point circuit element (e.g., in the fabricated IC chip 102 based on the IC design 104). The test point clock gating circuit element has a clock input and a test input. The CGC logic 140 can couple the ungated input clock node identified by the clock detector 138 to the clock input of the test point clock gating circuit element. The CGC logic 140 can couple the test input in some examples to a global test mode signal of the testing circuitry 120 in the IC design 104. In other examples, the CGC logic 140 can insert a TDR element into the IC design 104 and couple the test input to a TDR element. The TDR element can be part of the testing circuitry 120, as shown in FIG. 1.

The test point clock gating circuit element can receive a test mode signal during test operations of the fabricated IC chip based on the IC design 104. The pattern generator circuit element can load a scan chain that includes the test point circuit element in the IC design 104 with ATPG test vectors, for application to the fabricated IC chip 102 during testing for manufacturing defects. The CGC logic 140 can couple an output of the test point clock gating circuit element to the clock input of the test point circuit element in the IC design 104. Thus, the ungated input clock can be provided to the test point circuit element based on the test mode signal received at the test input of the test point clock gating circuit element.

In some examples, the IC design 104 in response to being updated according to the examples herein can be provided to the IC test engine 122. The IC test engine 122 can employ ATPG techniques to generate the test patterns 124 for the updated version of the IC design 104. Because the test point logic 134 leverages (e.g., uses) an ungated input clock in the clock tree (e.g., the earliest ungated input clock in the clock tree) for the test point circuit element a coverage correlation gap is improved in contrast to test point insertion techniques that use a closest gated input clock in the clock tree. Because IC designs generated according to the examples herein use ungated input clocks in a clock tree for test point circuit elements, a greater test coverage can be realized for a given number of test patterns or an equal test coverage can be enabled using a lower number of test patterns, in contrast to IC design generated that use gated input clocks in a clock tree. Thus, by using the ungated clock input for the test point circuit element in the IC design 104, an efficiency of testing the updated version of the IC design 104 can be improved.

The coverage correlation gap is a difference between an estimated coverage with a given number of test patterns versus an achieved coverage with a same number of test patterns following test point insertion by the test point logic 134. For example, the IC test engine 122 can estimate a percentage of LBIST coverage provided for the IC design 104. The IC test engine 122 can estimate the percentage of LBIST coverage by implementing random pattern testability analysis on the IC design 104. The IC test engine 122 can estimate the percentage of LBIST coverage after test point insertion (referred to as the achieved coverage) by implementing the random pattern testability analysis on the updated version of the IC design 104. The IC test engine 122 can compute an LBIST coverage correlation gap based on the computed percentages.

While using ungated input clocks for test-point insertion reduces a coverage correlation gap, such free-running clocks used for enabling operations of test point circuit elements of testing circuitry in an IC design increase the amount of power consumed during a functional mode of operation of the test point circuit elements. During the functional mode of operation, the test point circuit elements are not capturing nor shifting out captured values at a respective node in the IC design, however, continue to receive an ungated input clock. Because the ungated input clock causes switching circuit elements (e.g., flip flops) of the test point circuit elements to continue switching states increases an amount of dynamic power that is dissipated by the test point circuit elements and thus the testing circuitry. By employing the test point clock gating circuit element in the IC design 104 allows for control over when the ungated input clock is provided to the test point circuit element during the functional mode of operation. Because the test point clock gating circuit element does not provide the ungated input clock to one or more test point circuit elements during the functional mode of operation, the dynamic power consumed by the one or more test point circuit elements (e.g., in a fabricated IC chip based on the IC design) is curtailed, as switching elements of the test point circuit elements do not switch states.

Moreover, the use of test point clock gating circuit elements in the IC design 104 for clock gating the ungated input clocks for test point circuit elements has minimal or in some instances, no impact on the coverage correlation gap. The IC test engine 122 has to generate minimal additional test patterns or in some instances no additional test patterns to enable clock gating logic on a clock tree path. By employing the clock gating techniques described herein, a number of faults detected can be increased (e.g., in the fabricated IC chip 102 based on the updated version of the IC design 104) without an increase, in some instances a minimal increase, in a number of test patterns for fault detection that is needed while reducing test point dynamic power consumption during testing operations.

In some examples, the synthesis tool 114 can identify test point circuit elements for the IC design 104 that are to share a common ungated input clock and that are to be coupled to a similar source circuit element in the IC design 104. By identifying test point circuit elements that are to have a common ungated input clock and/or are to be powered by a similar source circuit can reduce a number of test point clock gating circuit elements for the IC design 104 for clock gating the test point circuit elements therein. The synthesis tool 114 can logically group test point circuit elements for the IC design 104 into respective clock and power domains. Because select test point circuit elements in the fabricated IC chip based on the IC design are to be enabled together (e.g., rather than all of the test point circuit elements), an amount of power that is dissipated by the test point circuit elements of the fabricated IC chip is reduced. Accordingly, the synthesis tool 114 as described herein can provide the IC design 104 that once fabricated can dissipate less power during functional and test mode of operations of test point circuit elements.

As indicated above, the test point circuit elements for insertion into the IC design 104 by the test point logic 134 can use or share a same clock tree and thus operate in a similar clock domain. The term "clock domain" as used herein can refer to a logical partitioning of test point circuit elements for an IC design that is to receive a similar ungated input clock from a clock tree. For example, a first test point circuit element and a second test point circuit element for the IC design 104 can receive a similar ungated input clock from a respective clock tree in the IC design 104. Because the first and second test point circuit elements are to operate on a similar ungated input clock, the first and second test point circuit elements can be associated (e.g., logically linked in the memory 108) with a respective clock domain.

In some examples, the test point circuit elements that are to be inserted by the test point logic 134 into the IC design 104 are to be powered by a similar source circuit element. The term "power domain" as used herein can refer to a logical partitioning of test point circuit elements for an IC design that is to receive a similar operating voltage. Thus, by way of further example, the first and second test point circuit elements in the IC design 104 can receive a similar operating voltage. Because the first and second test point circuit elements are to receive a similar operating voltage, the first and second test point circuit elements can be associated (e.g., logically linked in the memory 108) with a respective power domain.

To identify the test point circuit elements for the IC design 104 that are to share a similar power and/or clock domain, and thus logically partition the test point circuit elements, the synthesis tool 114 employs a domain partitioner 142. For example, the domain partitioner 142 can evaluate ungated input clocks (e.g., as identified by the clock detector 138, as described herein) for the test point circuit elements to identify which test point circuit elements share a common ungated input clock and thus belong to a similar clock domain. The domain partitioner 142 can generate clock domain data 144 identifying the test point circuit elements that are associated with a respective clock domain.

As an example, if the first and second test point circuit elements are to receive a first ungated input clock and third and fourth test point circuit elements are to receive a second ungated input clock, the domain partitioner 142 can provide the clock domain data 144 that indicates that the first and second test point circuit elements belong to a first clock domain and that the third and fourth test point circuit elements belong to a second clock domain. Thus, the clock domain data 144 can represent a logical clock partitioning for the IC design 104 and identify for at least some, in some instances all, test point circuit elements for the IC design 104 that are to receive a similar ungated input clock. The clock domain data 144 can be stored in the memory 108 for further processing, as described herein.

In some examples, the domain partitioner 142 can determine which test point circuit elements for the IC design 104 are to receive a similar operating voltage. For example, the domain partitioner 142 can derive this power domain information from a design UPF that is used in designs to provide power partitioning information for the IC design 104. The domain partitioner 142 can generate power domain data 146 identifying the test point circuit elements that are to be powered by a common source circuit element.

As an example, if the first and second test point circuit elements are to be powered by a first source circuit element and the third and fourth test point circuit elements are to be powered by a second source circuit element in the IC design 104, the domain partitioner 142 can provide the power domain data 146 that indicates that the first and second test point circuit elements belong to a first power domain and the third and fourth test point circuit elements belong to a second power domain. Thus, the power domain data 146 can represent a logical power partitioning for the IC design 104 and identify for at least some, in some instances all, test point circuit elements that are powered by a similar source circuit element in the IC design 104. The power domain data 146 can be stored in the memory 108 for further processing, as described herein.

By way of further example, the clock domain data 144 can identify multiple clock domains to which respective test point circuit elements can belong. Moreover, the power domain data 146 can identify multiple power domains to which the respective test point circuit elements can belong. In some examples, the clock domain data 144 and the power domain data 146 can overlap. For example, a set of test point circuit elements, as identified by the clock domain data 144, can be powered by a same source circuit element, as identified by the power domain data 146.

The synthesis tool 114 can further include a domain matrix generator 148. The domain matrix generator 148 can process the clock and power domain data 144 and 146 to identify test point circuit elements associated with respective power and/or clock domains that can be tested together. For example, the domain matrix generator 148 can compute a CP domain matrix 150 based on the clock and power domain data 144 and 146. The CP domain matrix 150 can include cells or blocks that identify a number of test point circuit elements that are associated with a respective clock and power domain.

The domain matrix generator 148 can implement a clock domain reduction method on the CP domain matrix 150 to identify cells therein and thus respective test point circuit elements associated with respective clock domains that can be tested together. The domain matrix generator 148 can merge cells of the CP domain matrix 150 identifying the test point circuit elements associated with respective clock domains that can be tested together. The reduced version of the CP domain matrix 150 can be referred to as a first reduced CP domain matrix.

By way of further example, the domain matrix generator 148 can implement a power domain reduction method on the first reduced CP domain matrix. The domain matrix generator 148 can identify cells in the first reduced CP domain matrix and thus respective test point circuit elements associated with respective power domains that can be tested together. The domain matrix generator 148 can merge the cells of the first reduced CP domain matrix identifying the test point circuit elements associated with respective power domains that are to be tested together to further reduce the first reduced CP domain matrix. The reduced CP domain matrix provided by the domain matrix generator 148 after applying the power domain reduction method to the first reduced CP matrix can be referred to as a second reduced CP domain matrix.

In some examples, the domain matrix generator 148 can iteratively implement the clock and power domain reduction methods. The domain matrix generator 148 can evaluate each reduced CP domain matrix following a respective domain matrix reduction using one of the clock and power domain reduction methods, or a combination thereof, to minimize or reduce a number of test point clock gating circuit elements for the IC design 104. By identifying test point circuit elements for the IC design 104 that can be tested together can reduce a number of test point clock gating circuit elements for the IC design 104 as test mode signals can be shared among a set of the test point circuit elements for the IC design 104. In some instances, the domain matrix generator 148 can evaluate the CP domain matrix 150 a reduced CP domain matrix, for example, after a number of iterations, to identify clock and domain block combinations that are not associated with at least one test point circuit element. The domain matrix generator 148 can remove these clock and domain block combinations to further reduce the CP domain matrix as no test point circuit element is associated with these blocks.

The domain matrix generator 148 can provide the reduced CP domain matrix after a number of iterations as a reduced CP domain matrix 152, as shown in FIG. 1. The reduced CP domain matrix 152 can be provided to the test point logic 134. The CGC logic 140 can employ the reduced CP domain matrix 152 to determine a number of test point clock gating circuit elements for the IC design and how the test point clock gating circuit elements are to be coupled with respect to corresponding test point circuit elements in the IC design 104. Moreover, the CGC logic 140 can determine which test point circuit elements in the IC design 104 are to be tested together based on which clock and power domains that the test point circuit elements belong as identified in reduced CP domain matrix 152.

The CGC logic 140 can insert the test point clock gating circuit elements into the IC design 104 and couple the test point clock gating circuit elements to corresponding test point circuit elements in the IC design 104 based on the reduced CP domain matrix 152. The CGC logic 140 can insert the test mode signal generation element into the IC design 104. The CGC logic 140 can configure (e.g., program) the test mode signal generation element, for example, when to provide a respective test mode signal to test point circuit elements associated with a respective power and/or clock domain based on the reduced CP domain matrix 152.

For example, the CGC logic 140 can couple respective clock inputs of the test point clock gating circuit elements for a respective power and clock domain (e.g., as identified by the reduced CP domain matrix 152) to a respective ungated input clock node in the IC design 104. The CGC logic 140 can couple respective test inputs of the test point clock gating circuit elements to a respective test input of the test mode signal generation element, and couple an output of the test point clock gating circuit elements to a clock input of a respective one of the test point circuit elements in the IC design 104. Because the test mode signal generation element enables select test point circuit elements of the test point circuit elements in the fabricated IC chip 102 during testing operations, an amount of power that is dissipated by the test point circuit elements in the fabricated IC chip 102 is reduced as select test point circuits elements are enabled and dissipating power (rather than all of the test point circuit elements) during the test mode of operation. The updated version of the IC design 104 according to the examples described herein can be provided to the IC test engine 122 for generation of the test patterns 124 for testing the fabricated IC chip 102 for errors (e.g., faults and/or defects).

By way of further example, a dynamic power consumed by a test point circuit element in the IC design 104 can be represented as "p", as a single unit power. A dynamic power consumption of "n" number of inserted test points in the IC design 104 can be represented by the following expression: n*p. For each design partition (also referred to as a block or a core), a number of inserted test point circuit elements in each design partition or core for example, in cores A and B, and so on, can be represented by the following expressions as n(A) and n(B) respectively, etc. A dynamic power consumption of test point circuit elements in a respective core can be represented by the following expressions: p*n(A) for core A, p*n(B) for core B, etc. Thus, a dynamic power consumed by test point circuit elements in the IC design 104 with "N" cores, can be represented by the following expression p*n(A)+p*n(B)+ ... p*n(N)=p*(n(A)+n(B)+ ... n(N)).

A dynamic power consumption of a test point circuit element can be represented by the following expression: p*TM, wherein TM is a logical value of the test mode signal. In the functional mode of operation, as described herein, TM=0, and thus a dynamic power consumption of "n" inserted test point circuit elements in the IC design 104 is zero (0) (e.g., n*(p*TM)=0). Thus, a dynamic power consumption of test point circuit elements for a respective core in the IC design 104 can be expressed by the following expression: Old Flow Power−New Flow Power=p*(n(A)+n(b)+ ... n(N))−(n*p*TM)=(p*(n(A)+n(b)+ ... n(N)))−(n*p*0)=p*(n(A)+n(b)+ ... n(N)). A total power saving for "N" cores in the functional mode of operation of the test point circuit elements can be represented by the following expression: p*(n(A)+n(b)+ ... n(N)). In the test mode of operation, the power consumed by the test point circuit elements can be equal to the sum of the power of the number of test point circuit elements active in a respective power domain.

Accordingly, the examples described herein allow for insertion of test point circuit elements into an IC design having clock gated ungated input clocks, such that dynamic power consumed by the test point circuit elements in a fabricated IC chip based on the IC design during a test mode of operation is reduced. The use of test point clock gating circuits as described herein in the IC design for clock gating the ungated input clocks for test point circuit elements has minimum or no impact on the coverage correlation gap as an IC test engine (e.g., the IC test engine 122, as shown in FIG. 1) has to generate minimal additional test patterns or in some instances, no additional test patterns are needed to enable clock gating logic on a clock tree path.

By employing the clock gating techniques described herein, a number of faults detected can be increased without an increase, in some instances a minimal increase, in a number of the test patterns needed for fault detection. Moreover, in further examples, as described herein, the power and clock domains that each test point circuit element (or a subset thereof) is associated with for the IC design can be evaluated to identify test point circuit elements that can be tested together. By identifying the test point circuit elements that can be tested together reduces an amount of power dissipated by testing circuitry on a fabricated IC chip design based on the IC design.

Figure 2:
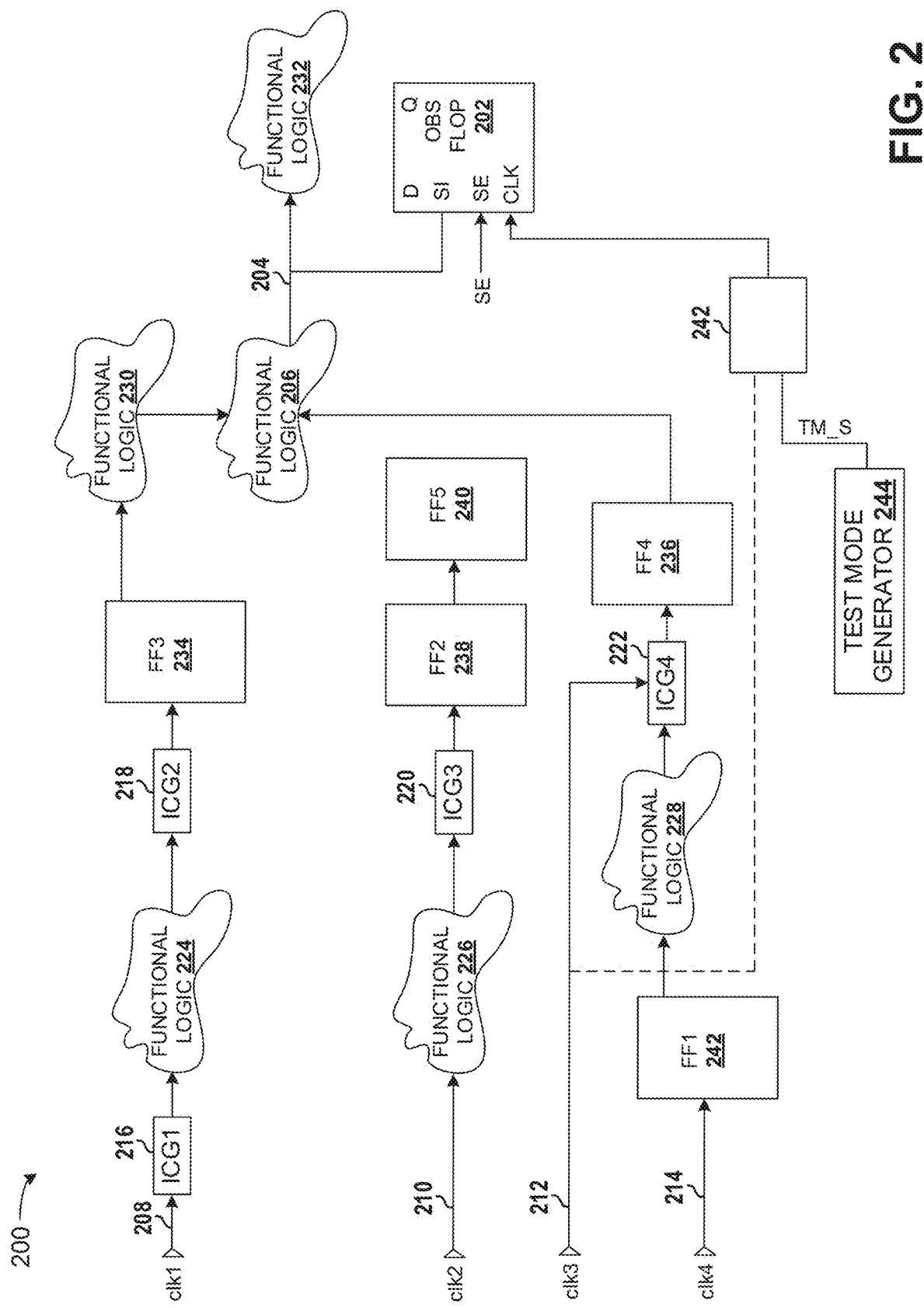
FIG. 2 illustrates an example of a partition of an IC design.

FIG. 2 illustrates an example of a partition of an IC design 200 that is employable in the IC design 104, as shown in FIG. 1. Thus, reference can be made to the example of FIG.

1 in the following description of FIG. 2. The IC design 200 includes a test point circuit element 202 (labeled "OBS FLOP") coupled to an output node 204 to which functional logic 206 is coupled. The test point circuit element 202 includes an SI input (labeled as "SI"), an SE input (labeled as "SE"), a clock input (labeled as "CLK"), a data input port (labeled as "D"), and an output port (labeled as "Q"). The functional logic 206 can represent functional logical operators (e.g., gates, or sequential logical operations) formed by cells (e.g., one or more cells of the cells 116, as shown in FIG. 1) that execute function of the IC design 200. For example, the functional logic 206 can include a particular cell that is to be tested for a particular fault/defect (e.g., an open wire, such as an open wire potentially causing a missing contact in a transistor) via a respective scan path. In the example of FIG. 2, test point insertion is illustrated with respect to output node 204. However, in other examples, test point insertion can be applied with respect to other nodes in the IC design 200.

The IC design 200 includes ungated clock input nodes 208, 210, 212, and 214. The ungated clock input nodes 208, 210, 212, and 214 can receive respective ungated input clocks clk1, clk2, clk3, and clk4. The IC design 200 further includes ICG circuit elements 216, 218, 220, and 222 (labeled respectively as "ICG1," "ICG2," "ICG3," and "ICG4"), and functional logic 224, 226, 228, 230, and 232. The functional logic 224, 226, 228, 230, and 232 can represent functional logical operators (e.g., gates, or sequential logical operations) formed by cells (e.g., one or more cells of the cells 116, as shown in FIG. 1) that execute function of the IC design 200. The IC design 200 includes a flip flop circuit 234 (labeled "FF3") coupled between the ICG circuit element 218 and the functional logic 230, and a flip flop circuit element 236 (labeled "FF4") that is clock gated by the ICG circuit element 222. The ICG circuit element 220 can clock gate a flip flop circuit element 238 (labeled as "FF2"), which is coupled to a flip flop circuit element 240 (labeled as "FF5"), as shown in FIG. 2. The functional logic 228 is coupled between a flip flop circuit element 242 (labeled "FF1") of the IC design 200, and the ICG circuit element 222.

In some examples, the IC test engine 122 can provide or make available to the synthesis tool 114 the testability data 132 for the IC design 104 in a same or similar manner as described herein. The testability data 132 can identify the output node 204. The output node 204 may be an unobservable node and the test point logic 134 can transform the output node 204 into an observable node. The test point logic 134 as described herein can embed the test point circuit element 202 and configure the test point circuit element 202 in the IC design 200 with respect to the output node 204, such that a value at the output node 204 can be observed.

For example, the test point logic 134 can couple the SI input of the test point circuit element 202 to the output node 204. The test point logic 134 can identify or select an ungated input clock of the IC design 200 for the test point circuit element 202. For example, the test point logic 134 can trace a clock (e.g., of logic circuitry) of the functional logic 206 that feeds into the output node 204 being tested back through all levels of clock gating logic. The test point logic 134 can trace back clock inputs to the flip flop circuit elements 234 and 236 and back through ICG circuit elements 216, 218, and 222 to the ungated input clocks clk1 and clk3. The ungated input clock from a last identified clock gating logic (e.g., the last element of a trace-back or earliest input in a clock tree) can be selected by the test point logic 134 for clocking the test point circuit element 202.

Thus, the test point logic 134 can select the ungated input clock clk3, as the clock for the test point circuit element 202. By using an earliest ungated clock for test point insertion, the IC test engine 122 may use a lower number of test patterns during simulation to make clock gates transparent. This provides a better correlation between random pattern testability analysis prior to insertion of the test point circuit element 202 and an actual achieved test coverage post insertion of the test point circuit element 202. Thus, an efficiency of testing circuitry (e.g., the testing circuitry 120, as shown in FIG. 1) in such IC designs can be improved as a greater coverage can be enabled for a given number of test patterns or an equal coverage using a lower number of test patterns.

In some examples, the test point logic 134 can employ the CGC logic 140 for insertion of a test point clock gating circuit element 242 into the IC design 200. By way of example, the test point clock gating circuit element 242 can be implemented as an AND gate element. The test point clock gating circuit element 242 has a clock input and a test input. The CGC logic 140 can couple the ungated input clock node 212 for the ungated input clock clk3 to the clock input of test point clock gating circuit element 242. A coupling by the CGC logic 140 of the ungated input clock node 210 to the clock input of the test point clock gating circuit element 242 is shown with a dashed-line in the example of FIG. 2. The CGC logic 140 can couple the test input of the test point clock gating circuit element 242 to a respective output of a test mode signal generation element 244 of the IC design 200. During test mode, the value of the test mode signal is "1" and can be provided by a test vector. The test mode signal generation element 244 can provide a test mode signal (labeled as "TM_S") during testing operations of the IC design 200. In an example, the test mode signal generation element 244 is a TDR element.

For example, during testing operations of the IC design 200, the test point circuit element 202 can operate in a functional mode or a test mode. For example, the test point circuit element 202 can operate in the test mode over a first time interval that includes one or more capture cycles. The ungated input clock clk3 is provided to the clock input of the test point circuit element 202 by the test point clock gating circuit element 242 in response to receiving the test mode signal with a logical high value (e.g., a logical "1") from the test mode signal generation element 244. The test mode signal with the logical high value can enable the test point clock gating circuit element 242 to provide the ungated input clock clk3 to the test point circuit element 202. The test point circuit element 202 can capture data (e.g., provided by the functional logic 206) at the output node 204 based on the ungated input clock clk3. During the first time interval, the test point circuit element 202 is provided with an SE signal having a logical low value at the SE input of the test point circuit element 202, as shown in FIG. 2. Because the SE signal is not asserted (e.g., has a logical "0") in the test mode of operation, during the one or more capture cycles, the test point circuit element 202 captures a value at the output node 204 and thus the value from the data output of the functional logic 206.

In some examples, over a second time interval that includes one more scan-shift cycles, the test point circuit element 202 can continue to operate in the test mode and receive the ungated input clock clk3. During the one or more scan-shift cycles, the test point clock gating circuit element 242 can continue to receive the test mode signal with the logical high value and be enabled to provide the ungated input clock clk3 to the test point circuit element 202. During the second time interval, the test point circuit element 202 is provided with the SE signal having the logical high value at the SE input of the test point circuit element 202. In the test mode of operation, during the one or more scan-shift cycles, the stored captured value at the output node 204 in the test point circuit element 202 can be scanned out and provided at the output port.

In some examples, during a third time interval, the test point circuit element 202 operates in the functional mode. For example, during the third time interval, the test point circuit element 202 does not receive the ungated input clock clk3. During the third time interval, the test mode signal is not asserted (e.g., has a logical low value, such as "0"). Because the test mode signal is not asserted, the test point clock gating circuit element 242 is disabled and does not provide the ungated input clock clk3 to the test point circuit element 202. Because the test point circuit element 202 is not receiving the ungated input clock clk3 during the third time interval, an amount of dynamic power that is consumed by the test point circuit element 202 is reduced as switching elements of the test point circuit element 202 do not switch states in response to the ungated input clock clk3, such as during the test mode of operation.

Figure 3:
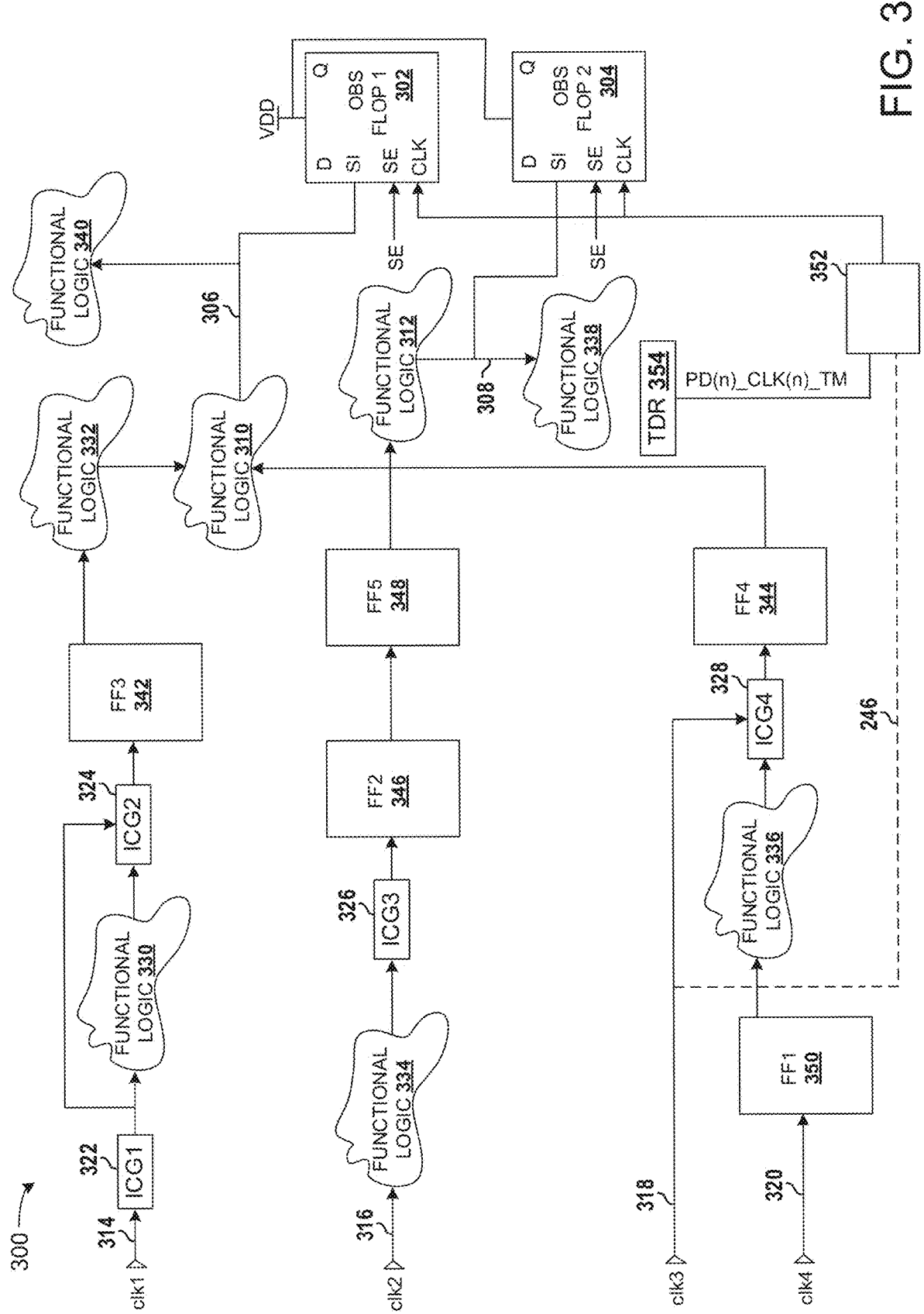
FIG. 3 illustrates an example of another partition of an IC design.

FIG. 3 illustrates an example of a partition of an IC design 300 that is employable in the IC design 104, as shown in FIG. 1. Thus, reference can be made to the example of FIG. 1 in the following description of FIG. 3. The IC design 300 includes test point circuit elements 302 and 304 (labeled "OBS FLOP 1" and "OBS FLOP 2" respectively) coupled to first and second output nodes 306 and 308, respectively. Each test point circuit element 302 and 304 includes a respective one of an SI input (labeled as "SI"), an SE input (labeled as "SE"), a clock input (labeled as "CLK"), a data input port (labeled as "D"), and an output port (labeled as "Q"). As illustrated in FIG. 3, the first output node 306 is coupled to an output of functional logic 310 and the second output node 308 is coupled to an output of functional logic 312. The functional logic 310 and 312 can represent functional logical operators (e.g., gates, or sequential logical operations) formed by cells (e.g., one or more cells of the cells 116, as shown in FIG. 1) that execute a function of the IC design 300. In the example of FIG. 3, test point insertion is illustrated for first and second output nodes 306 and 308. However, in other examples, test point insertion can be applied with respect to other nodes in the IC design 300.

The IC design 300 includes ungated clock input nodes 314, 316, 318, and 320. The ungated clock input nodes 314, 316, 318, and 320 can receive \ respective ungated input clocks clk1, clk2, clk3, and clk4. The IC design 300 further includes ICG circuit elements 322, 324, 326, and 328 (labeled respectively as "ICG1," "ICG2," "ICG3," and "ICG4" in FIG. 3), and functional logic 330, 332, 334, 336, 338, and 340. The functional logic 330, 332, 334, 336, 338, and 340 can represent functional logical operators (e.g., gates, or sequential logical operations) formed by cells (e.g., one or more cells of the cells 116, as shown in FIG. 1) that execute function of the IC design 300. The IC design 300 includes a flip flop circuit 342 (labeled "FF3") coupled between the ICG circuit element 324 and the functional logic 332, and a flip flop circuit element 344 (labeled "FF4") coupled between the ICG circuit element 328 and functional logic 310. A flip flop circuit element 346 (labeled as "FF2") can be coupled between a flip flop circuit element 348 (labeled as "FF5") and the ICG circuit element 326. The flip flop circuit element 348 can be coupled between the flip flop circuit element 346 and the functional logic 312, as shown in FIG. 3. The functional logic 336 is coupled between a flip flop circuit element 350 (labeled as "FF1") of the IC design 300 and the ICG circuit element 328.

As described herein, the IC test engine 122 can provide testability data 132 for the IC design 300. The testability data 132 can identify the first and second output nodes 306 and 308. The first and second output nodes 306 and 308 may be unobservable nodes and the test point logic 134 can transform the first and second output nodes 306 and 308 into observable nodes by incorporating the test point circuit elements 302 and 304 into the IC design 300 in a same or similar manner as described herein (e.g., with respect to FIG. 1 or 2). The test point logic 134 can incorporate the test point circuit elements 302 and 304 into the IC design 300 and configure the test point circuit elements 302 and 304 in the IC design 300 with respect to the first and second output nodes 306 and 308, respectively, such that a value at each of the first and second output nodes 306 and 308 can be observed. Thus, as illustrated in FIG. 3, the test point inserter 136 of the test point logic 134 can couple the SI input of the test point circuit element 302 to the first output node 306 and couple the SI input of the test point circuit element 304 to the second output node 308.

To enable operations of the test point circuit elements 302 and 304, the test point circuit elements 302 and 304 are coupled to a source circuit element (labeled as "VDD"). As described herein, the domain partitioner 142 can be used to logically group test point circuit elements for the IC design 300 into respective clock and power domains. The domain partitioner 142 can evaluate the ungated input clock clk3 (e.g., as identified by the clock detector 138, as described herein) for the test point circuit elements 302 and 304 to determine that these elements share a common ungated input clock and thus belong to a similar clock domain. The domain partitioner 142 can generate clock domain data 144 identifying the test point circuit elements 302 and 304 as being associated with a respective clock domain. In some examples, the domain partitioner 142 can determine which test point circuit elements for the IC design 300 are to receive a similar operating voltage. For example, the domain partitioner 142 can consume the power domain information of the IC design from UPF that enables the domain partitioner 142 to associate a power domain with the test point circuit based on which power domain of the design it is inserted in. The domain partitioner 142 can generate power domain data 146 identifying the test point circuit elements 302 and 304 as being associated with a similar power domain.

For clarity and brevity purposes, the example of FIG. 3, illustrates a single set of test point circuit elements operating a similar power and clock domain. However, in other examples, the domain partitioner 142 can identify multiple sets of test point circuit elements for the IC design 300 operating in respective similar power and clock domains. Thus, the clock and power domain data 144 and 146 in some examples can identify multiple instances of test point circuit elements (including the test point circuit elements 302 and 304) and corresponding clock and power domains for the test point circuit elements. The domain matrix generator 148 can process the clock and power domain data 144 and 146 to identify test point circuit elements associated with respective power and/or clock domains that can be tested together. By way of example, the test point circuit elements 302 and 304 are identified by the domain matrix generator 148 as operating in a respective power and clock domain and thus can be tested together.

As described herein, the domain matrix generator 148 can generate the CP domain matrix 150 wherein a respective cell can identify a number of test point circuit elements that are associated with a respect clock and power domain. For example, the respective cell can identify two (2) test point circuit elements that can correspond to the test point circuit elements 302 and 304 of the IC design 300 as belonging to a similar clock and power domain. In some examples, as described herein, the CP domain matrix 150 can be reduced by the domain matrix generator 148 by implementing the clock and power domain reduction methods. The domain matrix generator 148 can provide the reduced CP domain matrix after a number of iterations as the reduced CP domain matrix 152, as shown in FIG. 1. The reduced CP domain matrix 152 can include a cell identifying the test point circuit elements 302 and 304 and can be provided to the test point logic 134.

The CGC logic 140 of the test point logic 134 can employ the reduced CP domain matrix 152 to determine a number of test point clock gating circuit elements for the IC design 300 and how the test point clock gating circuit elements are to be coupled with respect to corresponding test point circuit elements 302 and 304 in the IC design 300. For example, the CGC logic 140 can determine that a single test point clock gating circuit element 352 can be used for clock gating the test point circuit elements 302 and 304 in the IC design 300. The CGC logic 140 can embed the test point clock gating circuit 352 into the IC design 300.

The CGC logic 140 can couple a clock input of the test point clock gating circuit element 352 to the ungated clock input node 318. A coupling of the ungated clock input node 318 to the clock input of the test point clock gating circuit element 352 is shown with a dashed-line in the example of FIG. 3. The CGC logic 140 can insert a TDR element 354 into the IC design 300. The CGC logic 140 can configure (e.g., program) the TDR element 354, for example, when to provide a respective test mode signal (labeled as "PD(n)_CLK(n)_TM", wherein n is indicative of a clock and power domain to which one or more test point circuit elements belong). The respective test mode signal can be provided to test point circuit elements associated with a respective power and/or clock domain. The CGC logic 140 can couple a test input of the test point clock gating circuit element 352 to a respective output of the TDR element 354, as shown in FIG. 3. Furthermore, the CGC logic 140 can couple an output of the test point clock gating circuit element 352 to the clock input of each of the test point circuit elements 302 and 304 thereby enabling the test point circuit elements 302 and 304 to receive the respective test mode signal.

During testing operations of the IC design 300, the test point circuit elements 302 and 304 can operate in a functional mode or a test mode. For example, the test point circuit elements 302 and 304 can operate in the test mode over a first time interval that includes one or more capture cycles. The ungated input clock clk3 is provided to the clock input of the test point circuit elements 302 and 304 by the test point clock gating circuit element 352 in response to receiving the respective test mode signal. The respective test mode signal can have a logical high value (e.g., a logical "1"). The respective test mode signal with the logical high value can enable the test point clock gating circuit element 352 to provide the ungated input clock clk3 to the test point circuit elements 302 and 304. Test point circuit elements 302 and 304 can capture data (e.g., provided by the functional logic 310 and 312) at one of the first and second output nodes 306 and 308 based on the ungated input clock clk3. During the first time interval, the test point circuit elements 302 and 304 are provided with a SE signal having a logical low value at the respective SE input. Because the SE signal is not asserted (e.g., has a logical "0") in the test mode of operation, during the one or more capture cycles, the test point circuit elements 302 and 304 capture a value at a respective one of the first and second output nodes 306 and 308 and thus the value from a data output of a respective one of the functional logic 310 and 312.

In some examples, over a second time interval that includes one more scan-shift cycles, the test point circuit elements 302 and 304 can continue to operate in the test mode and receive the ungated input clock clk3. During the one or more scan-shift cycles, the test point clock gating circuit element 352 can continue to receive the respective test mode signal with the logical high value and be enabled to provide the ungated input clock clk3 to each test point circuit element 302 and 304. During the second time interval, the test point circuit elements 302 and 304 are provided with the SE signal having the logical high value. In the test mode of operation, during the one or more scan-shift cycles, the stored captured value at the first output node 306 in the test point circuit element 302 and the stored captured value at the second output node 308 in the test point circuit element 304 can be scanned out and provided at a respective output port.

In some examples, during a third time interval, the test point circuit elements 302 and 304 operate in the functional mode. For example, during the third time interval, the test point circuit elements 302 and 304 do not receive the ungated input clock clk3. During the third time interval, the respective test mode signal is not asserted (e.g., has a logical low value, such as "0"). Because the respective test mode signal is not asserted, the test point clock gating circuit element 352 is disabled and does not provide the ungated input clock clk3 to the test point circuit elements 302 and 304. Because the test point circuit elements 302 and 304 are not receiving the ungated input clock clk3 during the third time interval, an amount of dynamic power that is consumed by the test point circuit elements 302 and 304 is reduced as switching elements of the test point circuit elements 302 and 304 do not switch states in response to the ungated input clock clk3, such as during the test mode of operation.

Figure 4:
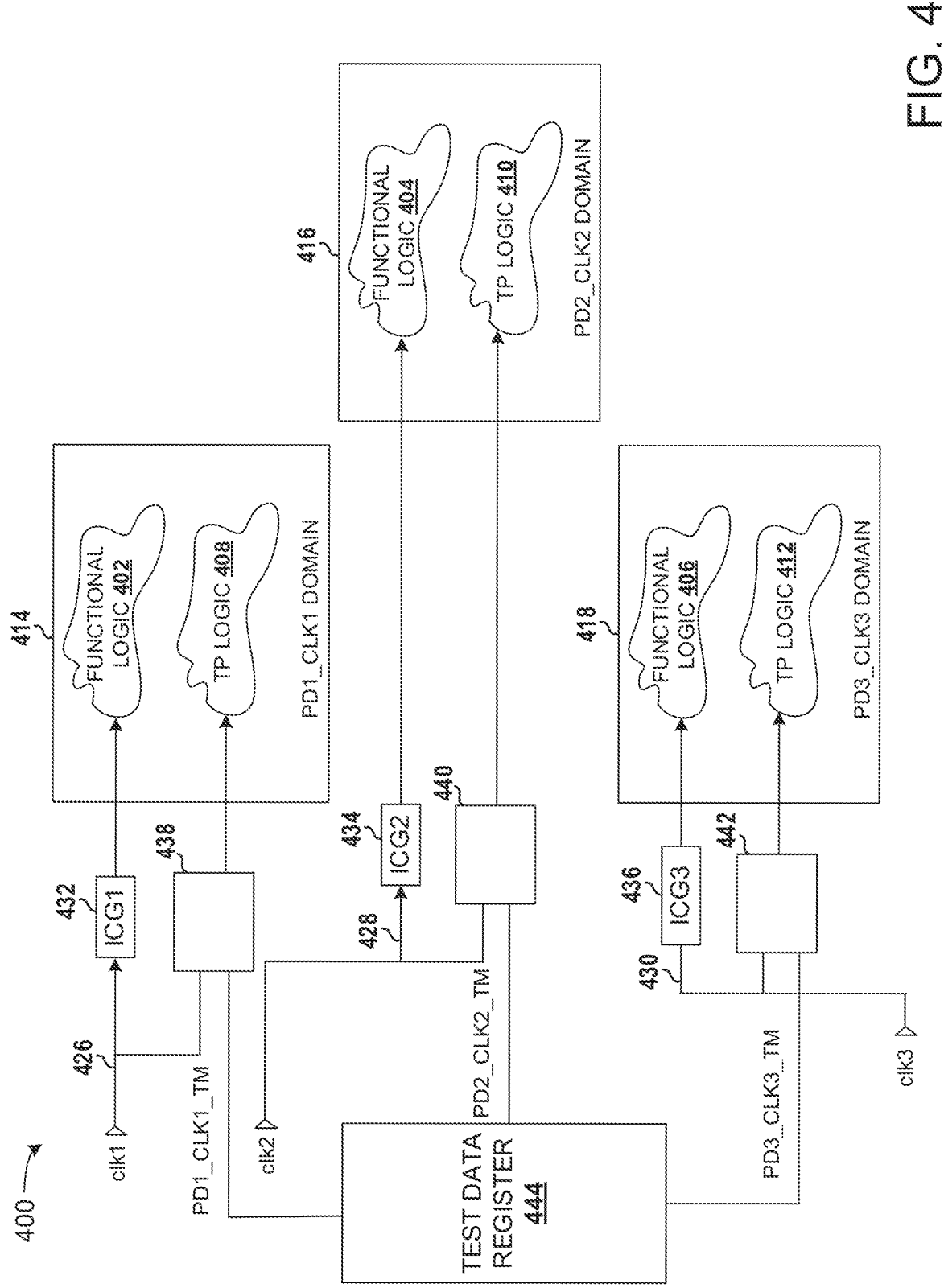
FIG. 4 illustrates an example of a further partition of an IC design.

FIG. 4 illustrates an example of a partition of an IC design 400 that is employable in the IC design 104, as shown in FIG. 1. Thus, reference can be made to the example of FIGS. 1, 2, and 3 in the following description of FIG. 4. In the IC design 400, functional logic 402, 404, and 406 and test point logic 408, 410, and 412 can be logically identified or organized as belonging to respective first, second, and third power and clock domains 414, 416, and 418 (labeled as "PD1_CLK1 DOMAIN," "PD2_CLK2 DOMAIN," and "PD3_CLK3 DOMAIN," respectively).

For clarity and brevity purposes, the IC design 400 illustrates three logically organized power and clock domains of functional and test point logic, however, in other examples, the IC design 400 can include any "n" number of power and clock domains of functional and test point logic of the IC design 400. Moreover, for clarity and brevity purposes, each power and clock domain 414, 416, and 418 illustrates a respective instance of functional and test point logic, however, in other examples, a respective power and clock domain can include any number of functional and test point logic. Furthermore, for clarity and brevity purposes, elements associated with functional and test point logic operating in a respective domain (e.g., flip flop circuit elements) have been omitted.

In the example of FIG. 4, the test point logic 408, 410, and 412 is associated with a respective power and clock domain and can be representative of test point circuit elements, for example, one of the test point circuit elements 302 and 304, as shown in FIG. 3. The test point logic 408, 410, and 412 can be used during testing of a respective cell of corresponding functional logic 402, 404, and 406 for a particular error (e.g., fault/defect). The test point logic 408, 410, and 412 can form part of the circuitry 120, as shown in FIG. 1. The test point logic 408, 410, and 412 can be incorporated (e.g., inserted or embedded) into the IC design 400 by the test point logic 134 in a same or similar manner as described herein (e.g., with respect to FIGS. 1, 2, and/or 3). For example, the test point logic 134 can implement the test point insertion method as described herein to insert the test point logic 408, 410, and 412 into the IC design 400. Thus, various test points in the test point logic 408, 410, and 412 can be coupled to various unobservable nodes in the IC design 400 in the respective functional logic 402, 404, and 406.

By way of further example, the IC design 400 can include ungated input clock nodes 426, 428, and 430. The ungated input clock nodes 426, 428, and 430 can receive respective ungated input clocks clk1, clk2, and clk3. The IC design 400 further includes ICG circuit elements 432, 434, and 436 (labeled respectively as "ICG1," "ICG2," and "ICG3"). The IC design 400 further includes test point clock gating circuit elements 438, 440, and 442. The CGC logic 140 can insert and couple each respective test point clock gating circuit elements 438, 440, 442 to other elements in the IC design 400, so as to result in a circuit arrangement, as shown in FIG. 4 in a same or similar manner as described herein (e.g., with respect to FIG. 1 or 2).

For example, the CGC logic 140 can couple respective clock inputs of the test point clock gating circuit elements 438, 440, and 442 to one of the ungated input clock nodes 426, 428, and 430. Furthermore, the CGC logic 140 can couple an output of each respective test point clock gating circuit elements 438, 440, and 442 to a respective clock input of a respective one of the test point logic 408, 410, and 412. In some examples, the CGC logic 140 can insert a TDR element 444 into the IC design 400. The CGC logic 140 can couple a test input of each test point control circuit 438, 440, and 442 to a test output of the TDR element 444. The CGC logic 140 can configure (e.g., program) the TDR element 444, for example, when to provide a respective test mode signal to test point circuit elements in a respective power and clock domain.

For example, during testing operations, the TDR element 444 can selectively provide one of a first test mode signal (labeled as PD1_CLK1_TM), a second test mode signal (labeled as "PD2_CLK2_TM), and a third test mode signal (PD3_CLK3_TM). Because select test point logic 408, 410, and 412 in a fabricated IC chip based on the IC design 400 are to be enabled (e.g., rather than all of the test point logic 408, 410, 412) during testing of respective functional logic, the amount of power that is dissipated by the test point logic 408, 410, 412 of the fabricated IC chip is reduced, as only a subset of test point logic is enabled.

For example, during test operations of the IC design 400, if the respective cell of functional logic 402 is being tested for defect (e.g., a manufacturing defect), the TDR element 444 can provide the first test mode signal to the test point clock gating circuit element 438 to enable said element to provide the ungated input clock clk1 to the test point logic 408 (e.g., for capturing and scan-shifting of values provided by the functional logic 402 at the unobservable nodes in 402). In other examples, during test operations of the IC design 400, if the respective cell of functional logic 404 is being tested for error, the TDR element 444 can provide the second test mode signal to the test point clock gating circuit element 440 to enable said element to provide the ungated input clock clk2 to the test point logic 410 (e.g., for capturing and scan-shifting of values provided by the functional logic 404 at the unobservable nodes in 410). In even further examples, during test operations of the IC design 400, if the respective cell of functional logic 406 is being tested for error, the TDR element 444 can provide the third test mode signal to the test point clock gating circuit element 442 to enable said element to provide the ungated input clock clk3 to the test point logic 412 (e.g., for capturing and scan-shifting of values provided by the functional logic 406 at the unobservable nodes in 412).

Figure 5:
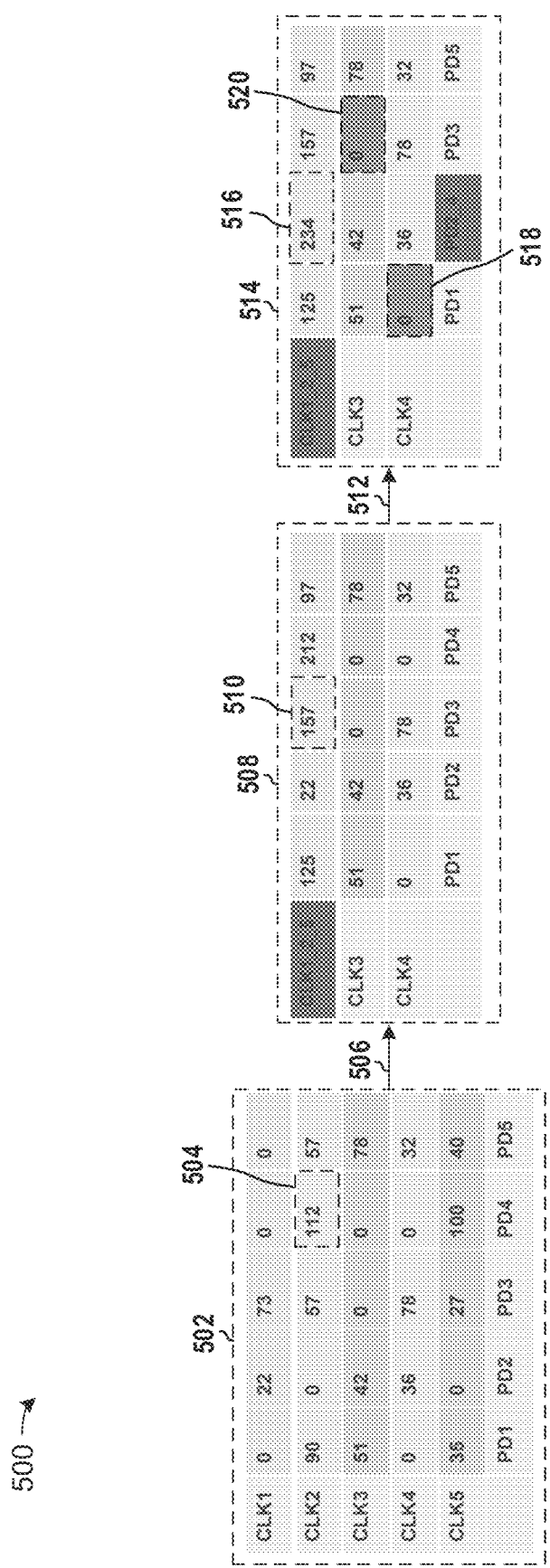
FIG. 5 is an example of a method of clock and power domain matrix reduction.
Figure 6:
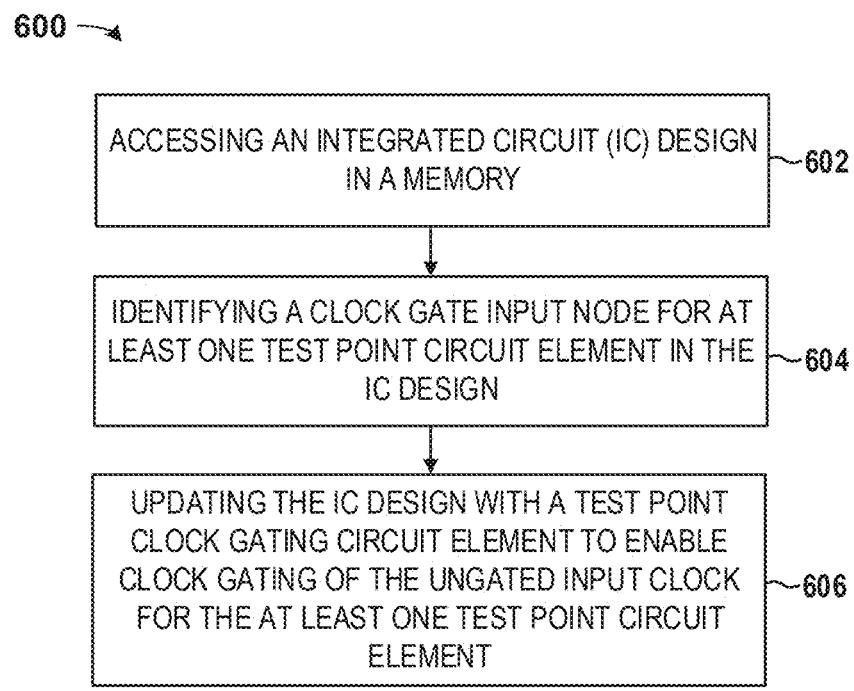
FIG. 6 illustrates a flowchart of an example method for IC design for reducing power consumption of testing circuitry during non-testing operations in fabricated IC chip based on the IC design.
Figure 7:
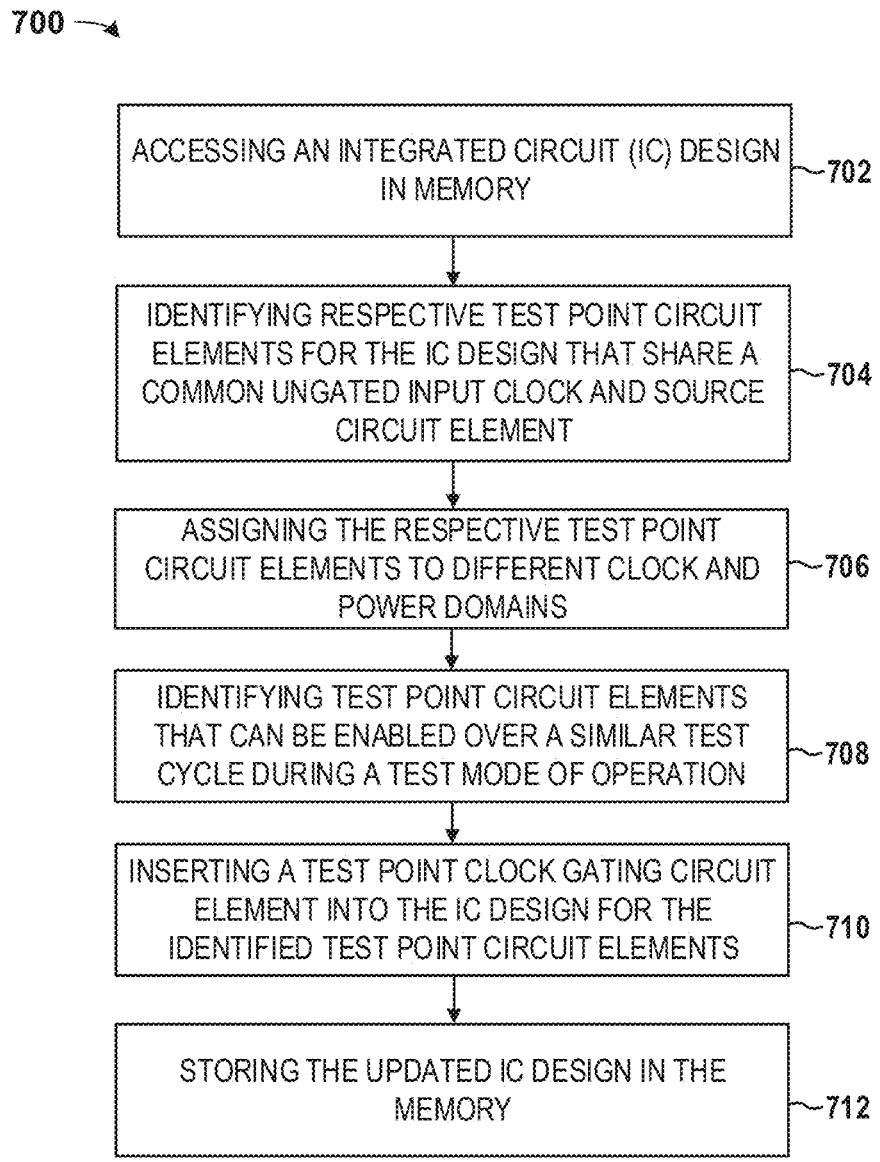
FIG. 7 illustrates a flowchart of an example method for IC design for reducing power consumption of testing circuitry during testing operations in fabricated IC chip based on the IC design.

In view of the foregoing structural and functional features described above, example methods will be better appreciated with reference to FIGS. 5-7. While, for purposes of simplicity of explanation, the example methods of FIGS. 5-7 are shown and described as executing serially, it is to be understood and appreciated that the present examples are not limited by the illustrated order, as some actions could in other examples occur in different orders, multiple times and/or concurrently from that shown and described herein. Moreover, it is not necessary that all described actions be performed to implement a method.

FIG. 5 is an example of a method 500 of clock and power domain matrix reduction. The method 500 can be implemented by the synthesis tool 114, as shown in FIG. 1. Thus, reference can be made to the example of FIG. 1 in the following description of FIG. 5. As described herein, the domain matrix generator 148 can compute the CP domain matrix 150 based on the power domain data 144 and 146 provided by the domain partitioner 142. In the example of FIG. 5, the CP domain matrix 150 is shown at 502. In the example of FIG. 5, the CP domain matrix 502 is a 5×5 matrix. In other examples, the CP domain matrix 502 can have different dimensions.

A dimension of the CP domain matrix 502 can be based on a number of different clock and power domains identified by domain partitioner 142, and thus specified by the clock and domain data 144 and 146. Each column in the CP domain matrix 502 can identify a respective power domain PD1, PD2, PD3, PD4, and PD5, and each row in the CP domain matrix 502 can identify a respective clock domain CLK1, CLK2, CLK3, CLK4, and CLK5. Each block or cell of the CP domain matrix 502 can specify a number of test point circuit elements that have been identified by the domain partitioner 142 as part of a similar clock and power domain. For example, a cell 504 with a test point circuit value of 125 indicates that 125 test point circuit elements belong to a second clock domain CLK2 and a fourth power domain PD4.

The method 500 can begin at 506 by identifying cells in the CP domain matrix 502 and thus test point circuit elements belonging to clock domains CLK1-CLK5 that can be tested together. By way of example, the test point circuit elements in respective clock domains CLK1, CLK2, and CLK5 can be identified (e.g., by domain matrix generator 148) as being able to be tested together. The identified cells in the CP domain matrix 502 can be merged at 506 to reduce the CP domain matrix 502 to a first reduced CP domain matrix 508. Test point circuit values indicative of test point circuit elements belonging to respective clock domains CLK1, CLK2, and CLK5 in the CP domain matrix 502 can be combined (e.g., added) to result in the first reduced CP domain matrix 508.

For example, a cell 510 of the first reduced CP domain matrix 508 has a test point circuit value of 157 which indicates that 73 test point circuit elements belong to the clock domain CLK1, 57 test point circuit elements belong to the clock domain CLK2 and 27 test point circuit elements belong to the clock domain CLK5 can be tested together. A first row of the first reduced CP domain matrix 508 is identified (e.g., labeled), for example, by the domain matrix generator 148, as "CLK1_2_5" to indicate that respective test point circuit elements belong to a combination clock domain that includes the clock domains CLK1, CLK2, and CLK5.

At 506, the CP domain matrix 502 can be reduced from a 5×5 matrix to a 3×5 matrix. While the example of FIG. 5 illustrates clock domains CLK1, CLK2, and CLK5 being combined at 506 in other examples, other clock domains can be combined if such clock domains can be tested together. In some examples, the domain matrix generator 148 can repeat step 506 with respect to the first reduced CP domain matrix 508 to further identify cells in the first reduced CP domain matrix 508 and thus test point circuit elements of respective clock domains that can be tested together.

At 512, the first reduced CP domain matrix 508 can be evaluated (e.g., by the domain matrix generator 148) to identify cells therein and thus test point circuit elements belonging to respective power domains PD1-PD5 that can be tested together. By way of example, the test point circuit elements of respective power domains PD2 and PD4 can be identified (e.g., by domain matrix generator 148) as being able to be tested together. The identified cells in the first reduced CP domain matrix 508 can be merged at 512 to further reduce the first reduced CP domain matrix 508 to a second reduced CP domain matrix 514. Test point circuit values indicative of test point circuit elements of respective power domains PD2 and PD4 in the first reduced CP domain matrix 508 can be combined (e.g., added) to result in the second reduced CP domain matrix 514.

For example, a cell 516 of the second reduced CP domain matrix 514 has a test point circuit value of 234 which indicates that 22 test point circuit elements of the power domain PD2 and 212 test point circuit elements of the power domain PD4 can be tested together. A second column of the second reduced CP domain matrix 514 is identified (e.g., labeled), for example, by the domain matrix generator 148, as "PD2_4" to indicate that test point circuit values in the second row identify test point circuit elements that belong to power domains PD2 and PD4 which can be tested together.

At 512, the first reduced CP domain matrix 508 can be reduced from a 3×5 matrix to a 3×4 matrix. While the example of FIG. 5 illustrates power domains PD2 and PD4 being combined at 512 in other examples, other power domains can be combined if such power domains can be tested together. In some examples, the domain matrix generator 148 can repeat step 512 with respect to the second reduced CP domain matrix 514 to further identify cells in the second reduced CP domain matrix 514 and thus test point circuit elements of respective power domains that can be tested together. In some examples, the method 500 can include identifying cells 518 and 520 in the second reduced CP domain matrix 514 that do not have any test point circuit elements that can be tested together. The cells 518 and 520 can be removed (e.g., deleted) from the second reduced CP domain matrix 514 to further reduce the second reduced CP domain matrix 514.

FIG. 6 illustrates a flowchart of an example method 600 for IC design for reducing power consumption of testing circuitry during non-testing operations in fabricated IC chip based on the IC design. The method 600 can be implemented by the synthesis tool 114, as shown in FIG. 1. Thus, reference can be made to the example of FIG. 1 in the following description of FIG. 6. The method 600 can begin at 602 by accessing, using one or more hardware processors (e.g., the processing unit 110, as shown in FIG. 1), the IC design (e.g., the IC design 200, as shown in FIG. 1) stored in memory (e.g., the memory 108, as shown in FIG. 1). The IC design can include one or more test point circuit elements (e.g., the test point circuit element 202, as shown in FIG. 2) and a test mode signal generation element (e.g., the test mode signal generation element 244, as shown in FIG. 2). At 604, identifying, using the one or more hardware processors, an ungated input clock (e.g., the ungated input clock clk3, as shown in FIG. 2) for at least one test point circuit element of the IC design.

At 606, updating, using the one or more hardware processors, the IC design stored in the memory by coupling a test point clock gating circuit element (e.g., the test point clock gating circuit element 242, as shown in FIG. 2) to a clock gate input node (the ungated clock gate input node 212, as shown in FIG. 2) that is to receive the ungated input clock for the at least one testing point circuit element, to the at least one test point circuit element, and to the test mode signal generation element that is to provide a test mode signal (e.g., the test mode signal TM_S, as shown in FIG. 2) to create an updated IC design. Because the test point clock gating circuit element is enabled and disabled based on a logical value of the test mode signal to control a supply of the ungated input clock to the at least one testing point circuit element, as described herein, dynamic power consumed by the at least one test point circuit element (e.g., in a fabricated IC chip based on the updated IC design stored in the memory) can be curtailed during a functional mode of operation. This is because switching elements (e.g., flip flops) of the at least one testing point circuit element do not switch states.

FIG. 7 illustrates a flowchart of an example method 700 for IC design for reducing power consumption of testing circuitry during testing operations in fabricated IC chip based on the IC design. The method 700 can be implemented by the synthesis tool 114, as shown in FIG. 1. Thus, reference can be made to the example of FIG. 1 in the following description of FIG. 7. The method 700 can begin at 702 by identifying an ungated input clock for respective test point circuit elements (e.g., the test point circuit element 302 and 304, as shown in FIG. 3) for the IC design (e.g., the IC design 104, as shown in FIG. 1). At 704, identifying a source circuit of source circuits for powering the respective test point circuit element for the IC design. At 706, generating clock and domain data (e.g., the clock and domain data 144 and 146, as shown in FIG. 1) identifying clock and power domains for each test point circuit element of the respective test point circuit elements for the IC design based on a respective identified ungated input clock and source circuit.

At 708, generating a CP domain matrix (e.g., the CP domain matrix 150, as shown in FIG. 1) based on the clock and power domain data. Each cell (e.g., the cell 504, as shown in FIG. 5) of the CP domain matrix can identify a number of test point circuit elements assigned to a given clock and power domain of a plurality of clock and power domains. At 710, identifying first and second sets of test point circuit elements assigned to different clock and power domains of the plurality of clock and power domains that are testable together during a test mode of operation of the first and second sets of test point circuit elements. At 712, accesses memory (e.g., the memory 108, as shown in FIG. 1) storing the IC design to update the IC design by coupling a first test point clock gating circuit element to a first clock gate input node in the IC design that is to receive a first ungated input clock for the first test point circuit element, and to an output of a signal generation element that is to provide a test mode signal, and by coupling a second test point clock gating circuit element to a second clock gate input node in the IC design that is to receive a second ungated input clock for the second test point circuit element, and to the output of the signal generation element to create an updated IC design. Because select test point circuit elements of the test point circuit elements in a fabricated IC chip based on the updated IC design are to be enabled together (e.g., rather than all of the test point circuit elements in the fabricated IC chip), an amount of power that is dissipated by the test point circuits elements in the fabricated IC chip is reduced during a test mode of operation.

Figure 8:
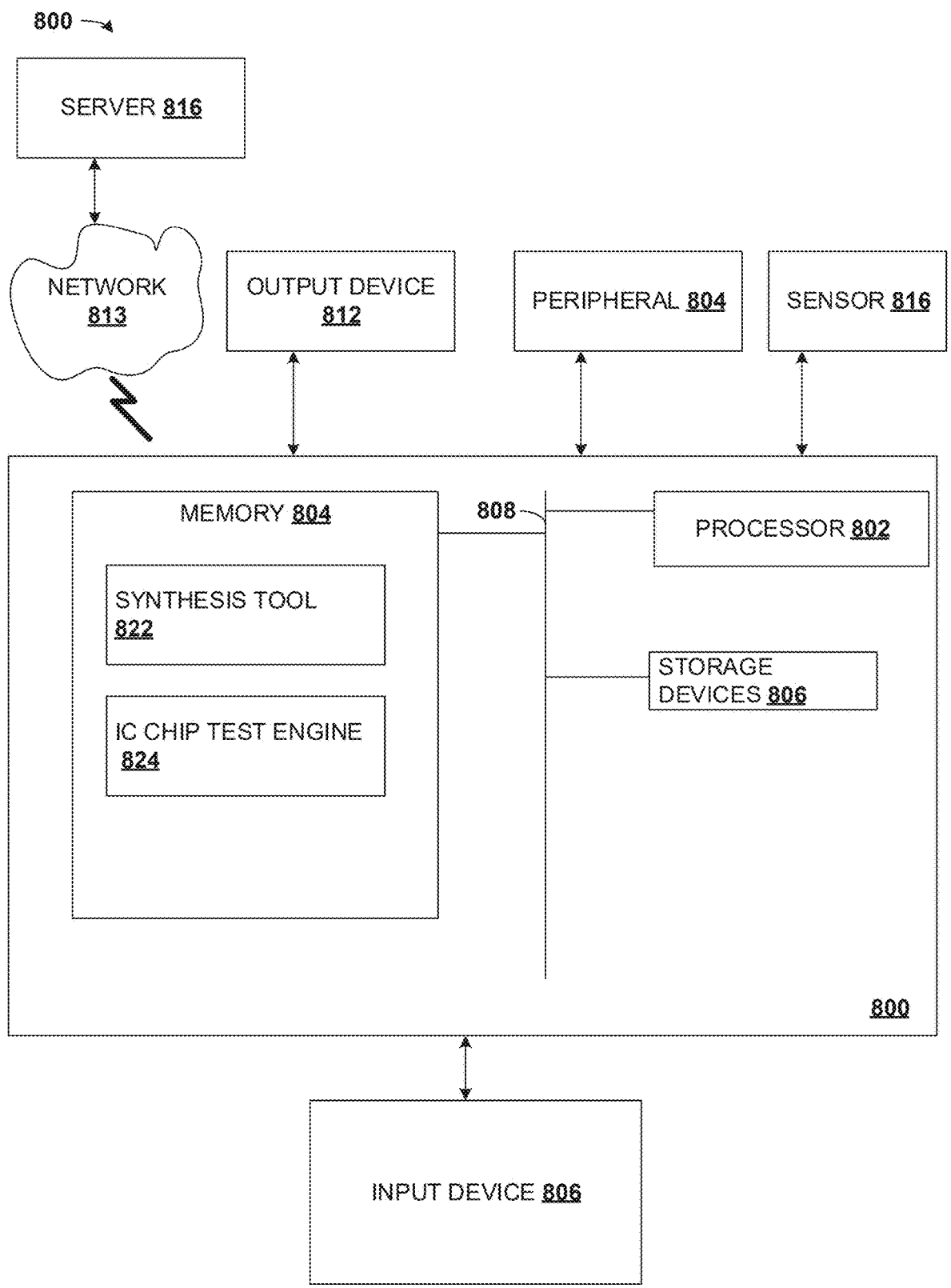
FIG. 8 illustrates an example of a computing system employable to execute a synthesis tool.

The examples herein may be implemented on virtually any type of computing system regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that include at least the minimum processing power, memory and input and output device(s) to perform one or more embodiments. As shown in FIG. 8, the computing system 800 can include a computer processor 802, memory 804 (e.g., RAM, cache memory, flash memory, etc.), one or more storage devices 806 (e.g., a solid state drive, a hard disk drive, an optical drive such as a compact disk (CD) drive or digital versatile disk (DVD) drive, a flash memory stick, etc.) and numerous other elements and functionalities. The computer processor 802 may be an integrated circuit for processing instructions. For example, the computer processor 802 may be one or more cores, or micro-cores of a processor. Components of the computing system 800 can communicate over a data bus 808.

The computing system 800 may also include an input device 810, such as any combination of one or more of a touchscreen, keyboard, mouse, microphone, touchpad, electronic pen, or any other input device. Further, the computing system 800 can include an output device 812, such as one or more of a screen (e.g., light emitting diode (LED) display, an organic light emitting diode (OLED) display, a liquid crystal display (LCD), a plasma display, touchscreen, cathode ray tube (CRT) monitor, projector, or other display device), a printer, external storage, or any other output device. In some examples, such as a touch screen, the output device 812 can be the same physical device as the input device 810. In other examples, the output device 812 and the input device 812 can be implemented as separate physical devices. The computing system 800 can be coupled to a network 813 (e.g., a local area network (LAN), a wide area network (WAN) such as the Internet, a mobile network, or any other type of network) via a network interface (not shown). The input device 810 and output device(s) 812 can be coupled locally and/or remotely (e.g., via the network 813) to the computer processor 802, the memory 804 and/or the storage device 806. Many different types of computing systems exist, and the input device 810 and the output device 812 can take other forms.

Software instructions in the form of computer readable program code to perform embodiments disclosed herein can be stored, in whole or in part, temporarily or permanently, on a non-transitory computer readable medium such as a CD, DVD, storage device, a diskette, a tape, flash memory, physical memory, or any other computer readable storage medium. Specifically, the software instructions can correspond to computer readable program code that when executed by a processor, is configured to perform operations disclosed herein. The computing system 800 can communicate with a server 816 via the network 813.

The memory 804 can include a plurality of EDA applications that can be employed to generate an IC design and/or execute a simulation of the circuit design, and verification (e.g., formal verification). More particularly, the memory 804 can include a synthesis tool 822 and an IC test engine 824. The synthesis tool 822 can correspond to the synthesis tool 114, as shown in FIG. 1, and the IC test engine 824 can correspond to the IC test engine 122, as shown in FIG. 1. According to the examples described herein, the synthesis tool 822 can implement test point insertion and power reduction techniques with respect to an IC design. The IC design once fabricated includes testing circuitry with test point circuit elements that consume a reduced amount of power during functional and normal modes of operations.

Further, one or more elements of the computing system 800 can be located at a remote location and coupled to the other elements over the network 813. Additionally, some examples can be implemented on a distributed system having a plurality of nodes, where each portion of an embodiment can be located on a different node within the distributed system. In one example, the node in the example of FIG. 8 corresponds to a distinct computing device. Alternatively, the node can correspond to a computer processor with associated physical memory. The node can alternatively correspond to a computer processor or microcore of a computer processor with shared memory and/or resources.

What has been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A computer implemented method comprising:
    accessing, using one or more hardware processors, an integrated circuit (IC) design stored in memory comprising one or more test point circuit elements and a test mode signal generation element;
    identifying, using the one or more hardware processors, an ungated input clock for respective testing point circuit elements of the IC design;
    identifying, using the one or more hardware processors, a source circuit of source circuits for powering the respective testing point circuit elements of the IC design;
    generating, using the one or more hardware processors, clock and domain data identifying clock and power domains for each testing point circuit element of the respective testing point circuit elements for the IC design based on a respective identified ungated input clock and source circuit;

generating, using the one or more hardware processors, a clock and power (CP) domain matrix based on the clock and power domain data, wherein each cell of the CP domain matrix identifies a number of testing point circuit elements assigned to a given clock and power domain of a plurality of clock and power domains;

identifying, using the one or more hardware processors, first and second sets of testing point circuit elements assigned to different clock and power domains of the plurality of clock and power domains that are testable together during a test mode of operation of the first and second sets of testing point circuit elements;

updating, using the one or more hardware processors, the IC design stored in the memory by coupling a first test point clock gating circuit element to a first clock gate input node that is to receive a first ungated input clock for the first set of testing point circuit elements, and to an output of a test mode signal generation element that is to provide a test mode signal, and by coupling a second test point clock gating circuit element to a second clock gate input node in the IC design that is to receive a second ungated input clock for the second set of testing point circuit elements, and to the output of the test mode signal generation element to create an updated IC design, the first and second test point clock gating circuit elements being enabled and disabled based on a logical value of the test mode signal to control a supply of the first and second ungated input clocks to the first and second sets of testing point circuit elements; and testing, using the one or more hardware processors, the updated IC design by providing one or more test patterns to test inputs of the updated IC design and causing the updated IC design, including the first and second sets of testing point circuit elements, to operate in response to the one or more test patterns.

2. The computer implemented method of claim 1, wherein the updating comprises:
coupling, using the one or more hardware processors, the clock gate input node to a clock input of the first and second test point clock gating circuit elements;
coupling, using the one or more hardware processors, a test input of the first and second test point clock gating circuit elements to a test output of the test mode signal generation element; and
coupling, using the one or more hardware processors, an output of the first and second test point clock gating circuit elements to a clock input of the first and second sets of testing point circuit elements.

3. The computer implemented method of claim 2, wherein the first and second test point clock gating circuit elements are enabled in response to receiving the test mode signal with a first logical value, the first and second test point clock gating circuit element to provide the first and second ungated input clocks to the clock input of the first and second sets of testing point circuit elements in response to being enabled.

4. The computer implemented method of claim 3, wherein the first and second test point clock gating circuit elements are disabled in response to receiving the test mode signal with a second logical value and do not provide the first and second ungated input clocks to the clock input of the first and second sets of testing point circuit elements.

5. The computer implemented method of claim 2, wherein the test mode signal generation element is a test data register and the first and second test point clock gating circuit elements are comprised of an AND gate.

6. The computer implemented method of claim 1, wherein the first set of testing point circuit elements is coupled to a respective first set of output nodes that respective first functional logic of the IC design is coupled in the IC design, and the second set of testing point circuit elements is coupled to a respective second set of output nodes that respective second functional logic of the IC design is coupled in the IC design.

7. A system comprising:
memory to store machine-readable instructions and an integrated circuit (IC) design comprising test point circuit elements and a test mode signal generation element; and
one or more processors to access the memory and execute the machine-readable instructions, the machine-readable instructions comprising;
a domain partitioner programmed to generate clock and power domain data identifying clock and power domains for the test point circuit elements for the IC design;
a domain matrix generator programmed to generate a clock and power (CP) domain matrix based on the clock and power domain data and apply clock and power domain reduction methods to the CP domain matrix to identify first and second test point circuit elements that belong to different clock and power domains and are testable together during a test mode of operation;
clock gating control (CGC) logic programmed to update the IC design stored in the memory by coupling a first test point clock gating circuit element to a first clock gate input node in the IC design that is to receive a first ungated input clock for the first test point circuit element, and to an output of the test mode signal generation element that is to provide a test mode signal, and further by coupling a second test point clock gating circuit element to a second clock gate input node in the IC design that is to receive a second ungated input clock for the second test point circuit element, and to the output of the signal generation element to create an updated IC design; and
testing logic programmed to test the updated IC design by providing one or more test patterns to test inputs of the updated IC design and causing the updated IC design, including the first and second sets of testing point circuit elements, to operate in response to the one or more test patterns.

8. The system of claim 7, wherein each cell of the CP domain matrix identifies a number of test point circuit elements of the test point circuit elements assigned to a given clock and power domain of the plurality of clock and power domains.

9. The system of claim 8, wherein the first and second test point clock gating circuit elements are enabled and disabled based on a logical value of the test mode signal to control a supply of one of the first and second ungated input clocks to a respective one of the first and second test point circuit elements.

10. The system of claim 9, wherein the CGC logic is to update the IC design by:
coupling, using the one or more hardware processors, the first clock gate input node to a clock input of the first test point clock gating circuit element and the second clock gate input node to a clock input of the second test point clock gating circuit element;

coupling, using the one or more hardware processors, a test input of the first test point clock gating circuit element to the output of the test signal generation element to receive the test mode signal, and a test input of the second test point clock gating circuit element to the output of the test signal generation element to receive the test mode signal; and coupling, using the one or more hardware processors, an output of the first test point clock gating circuit element to a clock input of the first test point circuit element, and an output of the second test point clock gating circuit element to a clock input of the second set of test point circuit element.

11. The system of claim 10, wherein the test mode signal generation element is a test data register (TDR), and the domain matrix generator is programmed to apply the clock and power domain reduction methods to the CP domain matrix to generate a reduced CP domain matrix, the CGC logic being programmed to configure TDR based on the reduced CP domain matrix to control when in the test cycle to provide the test mode signal to the first and second test point clock gating circuit elements.

12. A non-transitory machine-readable medium having machine-readable instructions, the machine-readable instructions comprising a synthesis tool that:

identifies an ungated input clock for respective test point circuit elements for an integrated circuit (IC) design;

identifies a source circuit of source circuits for powering the respective test point circuit element for the IC design;

generate clock and domain data identifying clock and power domains for each test point circuit element of the respective test point circuit elements for the IC design based on a respective identified ungated input clock and source circuit;

generates a clock and power (CP) domain matrix based on the clock and power domain data, wherein each cell of the CP domain matrix identifies a number of test point circuit elements assigned to a given clock and power domain of a plurality of clock and power domains;

identifies first and second sets of test point circuit elements assigned to different clock and power domains of the plurality of clock and power domains that are testable together during a test mode of operation of the first and second sets of test point circuit elements;

accesses memory storing the IC design to update the IC design by coupling a first test point clock gating circuit element to a first clock gate input node in the IC design that is to receive a first ungated input clock for the first test point circuit element, and to an output of a signal generation element that is to provide a test mode signal, and by coupling a second test point clock gating circuit element to a second clock gate input node in the IC design that is to receive a second ungated input clock for the second test point circuit element, and to the output of the signal generation element to create an updated IC design; and tests the updated IC design by providing one or more test patterns to test inputs of the updated IC design and causing the updated IC design, including the first and second sets of testing point circuit elements, to operate in response to the one or more test patterns.

13. The medium of claim 12, wherein the CP domain matrix is reduced by applying clock and power domain reduction methods to the CP domain matrix and the first and second test point elements are identified based on the reduced CP domain matrix.

14. The medium of claim 13, wherein the first and second test point clock gating circuit elements are enabled and disabled based on a logical value of the test mode signal to control a supply of one of the first and second ungated input clocks to a respective one of the first and second test point circuit elements.

* * * * *